US012762584B1

(12) United States Patent
Li et al.

(10) Patent No.: US 12,762,584 B1
(45) Date of Patent: Oct. 13, 2026

(54) ENHANCED REINFORCEMENT LEARNING-BASED UPLIFT MODELING TO MITIGATE DISCREPANCIES

(71) Applicant: Amazon Technologies, Inc., Seattle, WA (US)

(72) Inventors: Yingchuan Li, Bellevue, WA (US); Hansu Gu, Bellevue, WA (US); Gan Luan, Chicago, IL (US); Calvin Yue-Ren Kuo, Mercer Island, WA (US); Zheshen Wang, Bellevue, WA (US); Tian Chen, Redmond, WA (US); Liang Ge, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1132 days.

(21) Appl. No.: 17/845,599

(22) Filed: Jun. 21, 2022

(51) Int. Cl.
*G06Q 30/0202* (2023.01)
*G06Q 30/0601* (2023.01)

(52) U.S. Cl.
CPC ..... *G06Q 30/0202* (2013.01); *G06Q 30/0641* (2013.01)

(58) Field of Classification Search
CPC ........... G06Q 30/0202; G06Q 30/0641; G06Q 10/00–50/00
USPC ................................................ 705/7.11–7.42
See application file for complete search history.

(56) References Cited

U.S. PATENT DOCUMENTS 10,699,203 B1 * 6/2020 Ozcaglar .................. G06N 5/01
11,468,348 B1 * 10/2022 Cui .......................... G06N 3/08
11,562,400 B1 * 1/2023 Xu ...................... G06Q 30/0254
11,755,455 B1 * 9/2023 Kuo ......................... G06N 20/00 717/124
11,769,167 B1 * 9/2023 Esclusa ................ G06Q 20/201 705/14.25
12,417,468 B1 * 9/2025 Gu ...................... G06Q 30/0239
2007/0130090 A1 * 6/2007 Staib .................. G06Q 30/0222 705/14.69
2009/0030780 A1 * 1/2009 York ...................... G06Q 30/02 705/7.29
2012/0158474 A1 * 6/2012 Fahner ............... G06Q 30/0211 705/14.13

(Continued)

OTHER PUBLICATIONS

Shi, Claudia, David Blei, and Victor Veitch. "Adapting neural networks for the estimation of treatment effects." Advances in neural information processing systems 32 (2019). (Year: 2019).*

(Continued)

*Primary Examiner* — Alan S Miller
(74) *Attorney, Agent, or Firm* — Eversheds Sutherland (US) LLP

(57) ABSTRACT

Devices, systems, and methods are provided for using reinforcement learning-based uplift modeling to mitigate a context of a page view. A method may include identifying, by a first device, a context of a page view associated with information of a product presented to a user of an online retail system; providing a neural network to estimate an uplift between a first group of users of the online retail system who are presented the context of the page view and a second group of users of the online retail system who are not presented the context of the page view; determining the uplift using a trained neural network; and performing, based on the uplift, an action associated with mitigating the context of the page view.

18 Claims, 13 Drawing Sheets

(56) References Cited

U.S. PATENT DOCUMENTS

| | | | | |
|---|---|---|---|---|
| 2013/0013404 | A1* | 1/2013 | Suprock | G06Q 30/02 705/14.53 |
| 2013/0117073 | A1* | 5/2013 | Sakiyama | G06Q 30/0206 705/7.35 |
| 2013/0332260 | A1* | 12/2013 | Cheng | G06Q 30/0243 705/14.42 |
| 2017/0192638 | A1* | 7/2017 | Iscoe | G06N 3/04 |
| 2017/0262900 | A1* | 9/2017 | Ramachandran | G06N 20/00 |
| 2018/0240148 | A1* | 8/2018 | Georgoff | G06Q 10/107 |
| 2018/0285329 | A1* | 10/2018 | Alagappan | G06F 40/143 |
| 2019/0057104 | A1* | 2/2019 | Hassan | G06F 16/9577 |
| 2019/0311268 | A1* | 10/2019 | Tilton | G06N 3/084 |
| 2020/0302486 | A1* | 9/2020 | Ayoub | G06N 20/00 |
| 2021/0125612 | A1* | 4/2021 | Coman | G06N 3/0442 |
| 2022/0005091 | A1* | 1/2022 | Zak | G06Q 30/0623 |
| 2022/0012687 | A1* | 1/2022 | Bower | B65B 5/02 |
| 2022/0367051 | A1* | 11/2022 | Mcgrath | G06N 3/045 |
| 2023/0229906 | A1* | 7/2023 | Zhang | G06N 3/045 706/21 |
| 2023/0298028 | A1* | 9/2023 | Erdbrink | G06Q 20/4016 705/37 |

OTHER PUBLICATIONS

Ke, Wenwei, et al. "Addressing exposure bias in uplift modeling for large-scale online advertising." 2021 IEEE International Conference on Data Mining (ICDM). IEEE, 2021. (Year: 2021).*

Zhao, Xiangyu, et al. "Deep reinforcement learning for page-wise recommendations." Proceedings of the 12th ACM conference on recommender systems. 2018. (Year: 2018).*

Shang, Wenjie, et al. "Partially observable environment estimation with uplift inference for reinforcement learning based recommendation." Machine Learning 110.9 (2021): 2603-2640 (Year: 2021).*

* cited by examiner

540

ENHANCED REINFORCEMENT LEARNING-BASED UPLIFT MODELING TO MITIGATE DISCREPANCIES

BACKGROUND

Users of online retail systems may experience inconsistent information across multiple pages or even on a same page. For example, two different prices of a same product may be shown within a same page or on multiple pages, causing confusion for a user, and possibly affecting user outcomes. When multiple discrepancies for multiple users occur, systems may be unable to assess the impact of the discrepancies and prioritize which discrepancies to address.

Figure 1:
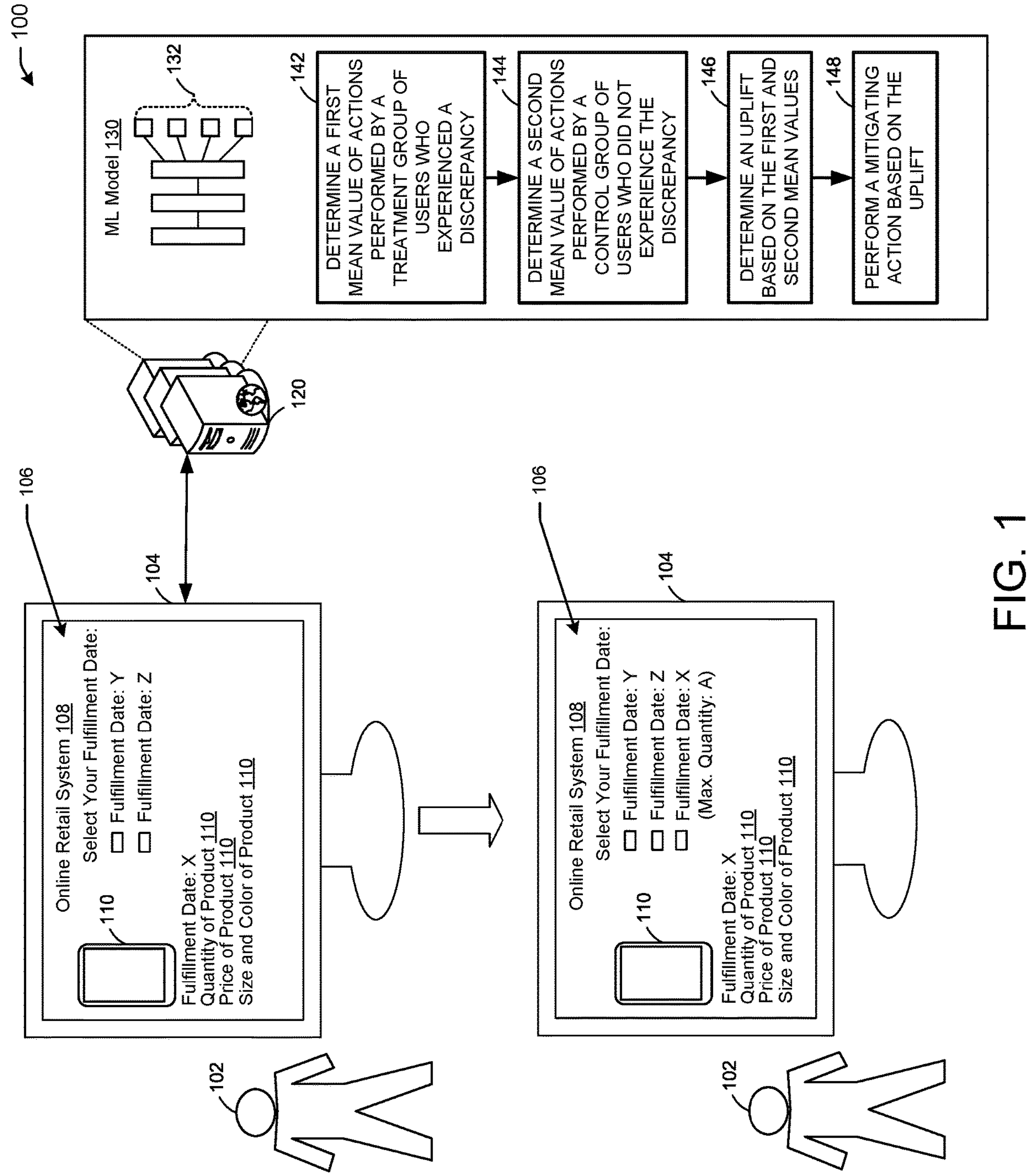
FIG. 1 illustrates an example process for using reinforcement learning-based uplift modeling to mitigate a context of a user page view, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using reinforcement learning-based uplift modeling to mitigate a context of a user page view.

When a user of an online system, such as an online retail system through which multiple products may be purchased, experiences inconsistent information (e.g., inconsistent prices for a same product, inconsistent fulfillment options for a product, inconsistent product information, and the like), a user's experience may be undermined. As a result, a user may spend additional time confirming information, such as the correct product price, fulfillment options, or product details, and/or may decide not to purchase a product due to the inconsistencies.

Uplift modeling may refer to a technique that models the incremental difference in outcome between a treatment group (e.g., a group of users who have experience inconsistencies in an online retail system) and a control group (e.g., a group of users who have not experienced such inconsistencies). For example, the uplift between a group of users who were presented with conflicting prices for a same product and a group of users who were presented with consistent prices for the same product may be an estimated effect on a user's likelihood of purchasing the product based on whether or not the user was presented with conflicting prices for the product.

Uplift modeling may use both causal inference modeling and machine learning. The causal inference modeling may be used to estimate the difference in outcomes that are mutually exclusive for an individual (e.g., the user experienced an inconsistent or did not). Machine learning models may need to be trained to select the most reliable model for predicting the uplift and to determine the impact on users who experienced the inconsistencies.

However, inconsistencies may vary in terms of impact on user behavior. Different types of inconsistencies may have different impact on user behavior, and a same inconsistency may have different root causes. For example, a promised delivery date may be shown as one date in a product detail page, and shown as another date on a checkout page, and the inconsistency may be caused by a changing of product quantity, changing of shipping address, or a system error. Inconsistencies with different root causes may have different impact on users. In addition, inconsistencies with a same root cause may have different impact on different customers. Some existing techniques may detect inconsistencies, but not their impact. Also, outcomes may be dependent on confounding factors whose effects on treatment groups may affect the impact estimates.

There is therefore a need for enhanced uplift modeling of user impact caused by inconsistencies.

In one or more embodiments, a causal inference model may measure the impact of inconsistent data presented to a user at an individual event level. The impact may be used to prioritize resolutions by allowing for identification and prioritization of inconsistencies that have the most significant user impact. The model may allow for measuring impact on perceived inconsistencies, referring to inconsistencies that are logically correct rather than caused by system errors (e.g., when a customer changes a quantity of products, the shipping date and price may change). The model may allow for real-time action to mitigate the impact of inconsistencies, such as by presenting messages to users addressing the inconsistencies when the inconsistencies have significant impact.

In one or more embodiments, the model may allow for measuring the impact of online retail events other than inconsistencies. Other context of one or more views of pages of the online retail system may undermine a user's experience with the online retail system. For example, when a user adds a quantity of a product to a virtual shopping cart and then changes the product quantity at the purchase page of the online retail system, the event of changing the product quantity may indicate that the user was not satisfied with the fulfillment options available for the quantity of the product selected (e.g., delivery may require too long for the user). The event of changing the product quantity may result in an eventual purchase, but the eventual purchase does not mean that the user experienced a "pain point" in the form of unsatisfactory fulfillment options for the originally selected product quantity. In one example, a user may add six of a product to the cart, and then may purchase three of the product. Later, the user may add three more of the product to the cart (e.g., to purchase the initial quantity of six that the user intended), further indicating that the event of changing the product quantity was a pain point for the user. The significance of the pain point may increase further when the user again alters the quantity of three to less than three (e.g., indicating that the user was again unsatisfied with the fulfillment options for the quantity of three). Because the delivery date may have changed when more than five of the product are purchased, the system may present to the user an indication that the earlier delivery date is available for up to a quantity of five.

In one or more embodiments, each event identified from a context of a page view (e.g., an inconsistency, a changed quantity at the purchase page, a changed fulfillment option—relative to what was presented at a product detail page—at the purchase page, etc.) may provide a signal, and each signal may have a respective strength indicative of how significant the event was to the user's experience. The model may be trained, as explained below, to assess the strength of any event (signal) in this manner. For example, referring to the example above in which the user adds six of a product to the cart, but does not purchase the product, that signal may be weak. However, if afterward the user changes the product quantity, resulting in an earlier fulfillment date, and then purchases the product, that signal may be a strong indicator that the user's experience was undermined by being dissatisfied with the later fulfillment date of the quantity of six. When the strength of any signal exceeds a strength threshold, the online retail system may perform an action, such as correcting an inconsistency, clarifying the maximum quantity that qualifies for a fulfillment date, and the like, as further described herein.

In one or more embodiments, to control for the effect of confounding factors on an inconsistency event, the causal inference model may model the uplift between the outcome in a treatment group and a control group conditional on confounding factors. The model may estimate the uplift based on Equation (1) below:

$$\Psi(X) = \mathbb{E}[Q(t=1|X)] - \mathbb{E}[Q(t=0|X)], \tag{1}$$

where $\Psi(X)$ is the uplift for an inconsistency event with confounding factors X, Q(, |X) is the outcome conditional on the confounding factors X, and T is the treatment indicator.

In one or more embodiments, the causal inference model may use a Dragonnet neural network. For example, a Dragonnet model may be a three-head neural network model with a representation layer first produced from an input layer followed by hidden layers. Then, both treatment outcome (Q(1,)) and control outcome (Q(0,)) may be predicted from the shared representation. The model may output a propensity score, which may represent a probability of an event being in the treatment group ($P_r(t=1)$). The model may choose a tradeoff between predictive accuracy and propensity score accuracy. The propensity score may be used to detect a new inconsistency not previously detected. After generating the conditional outcome and propensity score, another model may be fit to predict the uplift. An extended Dragonnet neural network may add the uplift as another head for the model. The loss optimization function may be represented by Equation (2) below:

$$\hat{\theta} = \text{argmin}[R(\theta, X) + \beta \cdot \gamma(y_i, t_i, x_i, \theta)] \tag{2}$$

where $\beta$ is a hyper-parameter, and $y_i$, $t_i$, $x_i$ are the outcome, treatment indicator, and confounding factors of the i-th data, respectively. The outcome loss $R(\theta,X)$ may be represented by Equation (3) below:

$$R(\theta, X) = \frac{1}{N}\sum_i \left[\hat{Q}(t_i, x_i; \theta) - y_i\right)^2 + \propto CrossEntropy(\hat{g}(x_i; \theta), t_i)\Big], \tag{3}$$

and the treatment prediction loss y may be represented by Equation (4) below:

$$\gamma = \sum_i \left[\left(\frac{t_i}{\hat{g}(x_i;\theta)} - \frac{1-t_i}{1-\hat{g}(x_i;\theta)}\right) * \left(y_i - \hat{Q}(t_i, x_i; \theta)\right) + \hat{Q}(1, x_i; \theta) - \hat{Q}(0, x_i; 0) - \hat{\psi}(x_i; \theta)\right]^2$$

(4), where $\alpha$ is another hyper-parameter, N is the number of data records, $\hat{Q}(t_i, x_i; \theta)$, $\hat{g}(x_i; \theta)$, and $\hat{\psi}(x_i; \theta)$ are the predicted outcome, propensity score, and uplift for the i-th data, respectively. Both the uplift and propensity score may be provided directly by the model.

In one or more embodiments, a system may perform data preprocessing, including data validation, deduplication, and construction of structural data for modeling as explained further herein. Then, the system may analyze the overall impact of inconsistencies on outcomes, and the uplift model may be fit for the different combinations of inconsistencies and outcomes. The system may perform feature analysis to understand the results of the model, and may detect unknown inconsistencies. For example, features may include whether a subscription-based offer is available to a user, whether a fulfillment date is promised to a user and within a certain number of days, which fulfillment provider is used, address type (e.g., residential versus commercial, street versus inside building delivery, etc.), a flexible shipping option used, a request to ship multiple products together, and the like.

In one or more embodiments, data preprocessing may include receiving fulfillment option information and product identifier information from checkout pages of the online retail system. Applying deduplication, the system may generate a unique record for any combination of customer identifier, session identifier, purchase identifier, request identifier, and delivery group identifier. Data preprocessing also may include receiving purchase information and merging information to add click stream data used to determine the pages visited by a user for a product identified by a product identifier. The system may combine pre-checkout page data and checkout page data to generate a data point for a user's visit of a checkout page. A data point may include a current checkout page segment, a history information segment, a future action segment, and an inconsistency label. The current checkout page segment may include information about a current checkout page (e.g., customer-related features, product identifier information, shipping-related information, and shopping characteristics). The history information segment may capture a user's history, such as the number of product pages that a user visited for a product prior to the user's current page. The future action segment may indicate user action after the current checkout page, such as purchase decision, number of pages visited, and time spent shopping after current checkout page until purchase or the end of the day (e.g., if no purchase occurred). The inconsistency label segment may include the information inconsistency whose impact is to be measured by the model.

In one or more embodiments, the model may measure the uplift of inconsistencies such as price-related inconsistencies and promise-related inconsistencies. For example, a price-related inconsistency may occur when users see certain prices and/or discounted shipping options in a previous checkout page, but not the current checkout page. A promise-related inconsistency may occur when there are inconsistencies within a same page or across different pages, such as when a product may be delivered or available for pick-up, product details, and the like. The model also may measure the uplift of other context of page views, as described above. The model may consider outcomes indicating whether or not a user purchased a product (e.g., in the same day as the session), whether the user visited additional pages for a product having the same identifier after visiting the checkout page for the product (e.g., indicating user confusion about information presented), whether the user adjusted product quantity prior to purchasing, for example.

In one or more embodiments, the system may consider price-related inconsistencies as having high impact on both purchase and user experience. The system may consider promise-related inconsistencies as having less impact on purchase, but still a significant contribution to loss of sales. For promise-related inconsistencies, inconsistency within a same checkout page may have a relatively high impact on purchase, and a smaller impact on the number subsequent pages visited. Promise-related inconsistencies occurring across different pages may have a higher impact on the number of pages visited after the product checkout page, and a lower impact on purchase.

In one or more embodiments, the neural network may be trained to assess the impact of inconsistencies at individual event levels. Using Equation (1) above allows for any record to have a chance in the treatment group and in the control group. To achieve this, the system may drop features that may mechanically determine whether a record is in a control group or treatment group. For example, for inconsistency of contract start date being later than upsell end date, the system may keep features regarding contract delivery promise information, and remove features regarding the upsell delivery promise information. The system may drop the records that can be mechanically determined to be in the control group. For example, for the inconsistency type having a contract start date being later than upsell end date, the system may drop the records having a contract start date being the same day as the date when the customer visited the page. In this case, the contract start date cannot be later than upsell end date, and the record will be in control group, and thus may be discarded.

In one or more embodiments, the neural network may be trained by splitting data to generating a training, validation, and testing dataset. The system may generate a single data point for a user's visit to a checkout page. When a user visits a checkout page multiple times for the same product, the system may generate multiple records for the user for the identifier of the product. Therefore, the records may not be independent. When the system divides the dataset, records from a same user may appear in multiple datasets. However, the system may need the datasets to be independent, so the system may split the data to generate the training, validation, and testing dataset based on a user identifier. The system may down-sample data in the control group due to an imbalance between treatment and control group data (e.g., the treatment group may be smaller than the control group).

In one or more embodiments, when modeling, the features regarding current checkout page information that cannot mechanically determine the assignment of the treatment group may be included in the model. History information features included in the model may either all be included, not included at all, or some minimum history information (e.g., the number of previous detail and checkout pages that a user visited for a product, without detailed information about previously visited pages) may be included.

In one or more embodiments, because a single event may be either the control group or the treatment group, but not in both, the model may lack a ground truth for the uplift. To account for the lack of ground truth, the system may evaluate the model at a group-level using an uplift chart. To produce the uplift chart, the system may order data by the predicted uplift (e.g., from high to low uplift). The system may organize the data into different bins. In each bin, there may be data from a treatment group and a control group. The system may determine the mean value of the outcome of interest for treatment and control groups, and use their difference as the actual uplift for the respective bin. The uplift chart may be a plot of the actual uplifts for the different bins. When the trend of the uplifts in the bins from left to right shows a decreasing uplift, such is an indication of a strong uplift model.

In one or more embodiments, a system may identify a discrepancy in information presented to a user of an online system. The discrepancy may be presented on a single page (e.g., conflicting information on a single page), or may occur across multiple pages visited by the user (e.g., during a same day). The system may identify actions taken by the user after the discrepancy is detected, such as whether the user visited additional pages for the same product prior to purchasing the product or failing to purchase the product altogether that day, whether the user contacted customer service for additional product information, whether the user wrote a negative customer review, and/or whether the user subsequently returned a purchased product.

In one or more embodiments, the system may use a neural network, as described herein, to determine a mean value of the actions for a treatment group who also experienced the discrepancy or other context of a user page view, and to determine a mean value of the actions for a control group who did not experience the discrepancy or other context of a user page view. The difference between the two mean values for the treatment and control groups may represent the impact of the discrepancy or other context of a user page view. In this manner, the overall impact of the discrepancy or other context of a user page view may be measured over a group of users rather than for just one single discrepancy or other context of a user page view event. Based on the impact of multiple discrepancies or other context of a user page view events, the system may rank the discrepancies or other context of a user page view events in terms of their impact, and may prioritize the performance of mitigating actions based on the rankings. The mitigating actions may occur within the online retail system or externally, in real-time or after a user session has completed. For example, the mitigating actions may include messages presented to the user via user interfaces of the online retail system, such as explanations, apologies, and offers, and/or may include external messages such as emails, text messages, and the like, apologizing, explaining that the discrepancy has been corrected, and providing offers. When a discrepancy is between different fulfillment options for a same product, the mitigating action may be to present a real-time message, using the page one which the discrepancy occurs, to indicate a maximum quantity of the product that may be purchased at a particular time while qualifying for one of the fulfillment options.

In one or more embodiments, a system may be detect discrepancies or other context of a user page view in real-time or afterward. Real-time detection may include analyzing presentation data presented to a user in the pages of the online retail system to identify conflicting information of a same category (e.g., price, description, fulfillment options, etc.). The detection therefore may be automatic (e.g., not requiring a user-submitted indication of the discrepancy). Alternatively, user feedback may indicate the discrepancy. For example, customer service contact, written complaints, and the like, may trigger the system to analyze the information presented on pages visited by a user for a given product to identify the conflicting information presented across a same page or across multiple pages in a same session (e.g., one day). Other indications of a context of a user page view to be assessed may include changing a product quantity or fulfillment option at the purchase page.

In one or more embodiments, the system may detect a context of a user's page view of one more pages of the online retail system. The model may be trained to assess the uplift of the context, such as an inconsistency, a change in product quantity after adding a quantity to a virtual cart, and a change in fulfillment date after adding a product to the virtual cart after presentation of the fulfillment date. The uplift may represent the significance of the context (e.g., weak, medium, strong, etc.). As explained above, the model may be trained based on treatment and control groups, the treatment groups having experienced the context, and the control groups not having experienced the context. When the uplift is greater than a threshold, the system may prioritize a mitigating action (e.g., relative to other events whose uplift is below the threshold). A user does not need to perform an action subsequent to the context in order for mitigation to occur, but some additional user actions as described above may indicate a strong significance (uplift) that may trigger a mitigating action.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for using reinforcement learning-based uplift modeling to mitigate a context of a user page view, in accordance with one or more example embodiments of the present disclosure.

Referring to FIG. 1, the process 100 may include a user 102 of a device 104 accessing a purchase page 106 an online retail system 108 (e.g., with which the user 102 may search for and purchase products). The online retail system 108 may display multiple pages, such as product information pages, search pages, virtual shopping cart/purchase pages, and the like. The pages may display information, such as products, product identifiers, product prices, fulfillment options (e.g., pick-up and/or delivery dates, time windows, and prices), quantity of a product to purchase, and/or other product information, such as product dimensions (e.g., size), product colors, product designs, product variations, product reviews, product sellers, product brands, and the like. In some situations, the information presented by one or more of the pages of the online retail system 108 may conflict, resulting in a discrepancy (e.g., a context of a user page view). For example, as shown in FIG. 1, a fulfillment date X is shown for a product 110, but the selectable fulfillment dates of Y and Z do not include the fulfillment date X, indicating a discrepancy. As a result, the user 102 may not be able to ascertain whether fulfillment date X is actually available for a purchase of the product 110, and may decide not to purchase the product 110 (e.g., during the current user session or at all), and/or may take subsequent actions indicating a negative user experience (e.g., may view additional pages of the online retail system 108 for information about the product 110 prior to or without purchasing the product 110, may contact customer service, may write a negative review of the product, seller, or the online retail system 108, may subsequently return the product 110 after purchasing it, and the like).

Figure 2:
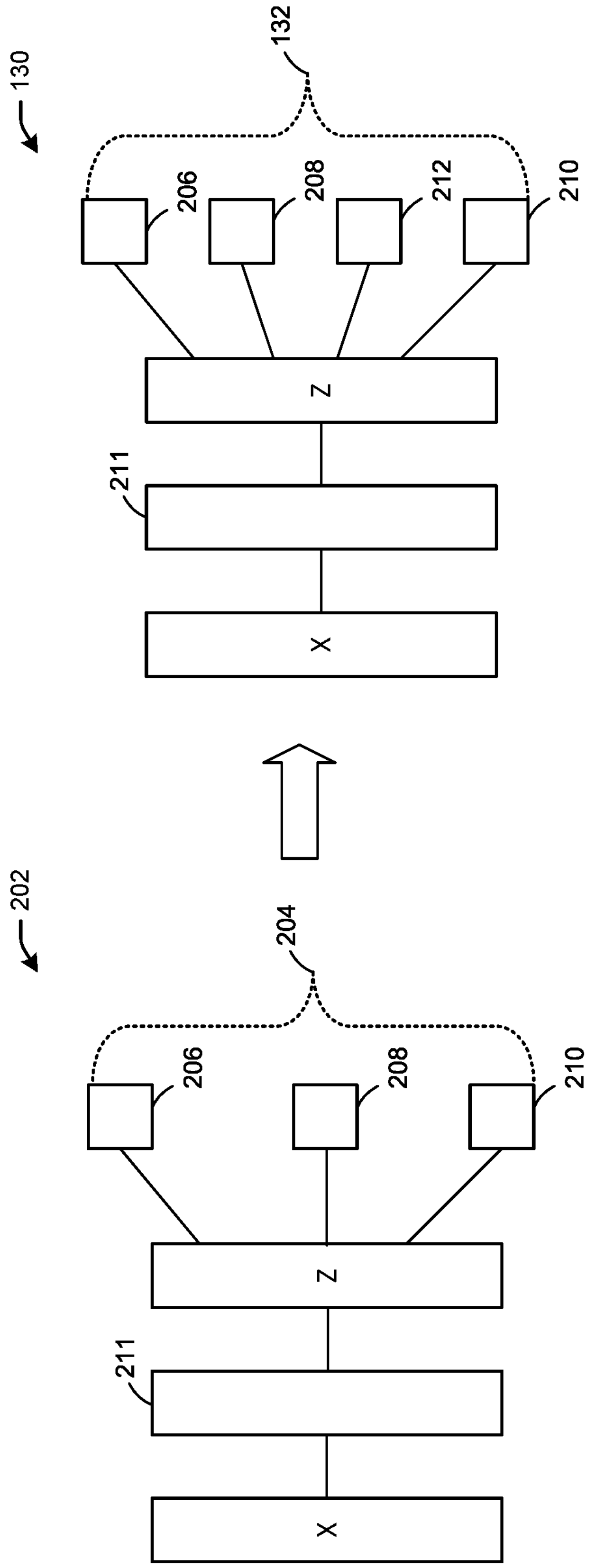
FIG. 2 illustrates an example machine learning model used for reinforcement learning-based uplift modeling to mitigate a context of a user page view, in accordance with one or more example embodiments of the present disclosure.

Still referring to FIG. 1, a remote system 120 (e.g., a server-based system) may include a machine learning model 130 having multiple heads 132 (e.g., a multi-headed neural network, as shown in FIG. 2). The remote system 120 may identify the discrepancy in which the fulfillment option X is presented as available and unavailable on the page 106. The remote system 120 may identify actions performed by the user 102, with the device 104, subsequent to the discrepancy. The machine learning model 130 may receive an indication of the discrepancy and an indication of the actions as inputs, and may be trained to estimate an uplift between a first group of users of the online retail system 108 who performed the actions after being presented the discrepancy (e.g., a treatment group including the user 102) and a second group of users of the online retail system 108 who performed the actions without being presented the discrepancy (e.g., a control group). The remote system 120 may determine, at step 142, using the neural network, a first mean value of the actions for the first group of users. The remote system 120 may determine, at step 144, using the neural network, a second mean value of the actions for the second group of users. Examples of the actions and their mean values are explained below with reference to FIGS. 5A and 5B, for example. The remote system 120 may determine, at step 146, using the neural network, a difference between the first mean value and the second mean value, the difference representing the uplift. At step 148, based on the uplift, the remote system 120 may perform a mitigating action. As shown in FIG. 1, the mitigating action may include updating the page 106 to present the fulfillment option X as available, and to present an indication that the fulfillment option X is available for up to a maximum quantity of the product 110. When the uplift exceeds a threshold at step 148, the system may prioritize and perform the mitigating action.

Still referring to FIG. 1, based on the uplift, the remote system 120 may determine a priority of the discrepancy among other similarly identified discrepancies, as further explained herein. For example, discrepancies having the most significant negative uplift may be the most impactful on a user's experience, so the remote system 120 may prioritize mitigation of discrepancies having the most significant negative uplift. The remote system 120 may cause, based on the priorities, performance an action associated with mitigating the discrepancy. As shown in FIG. 1, the action may include providing, in real-time (e.g., using the page 106 during the same user session), an indication the fulfillment date X is available for the product 110, and may provide additional context, such as quantity limitations (e.g., the maximum quantity of the product 110 that can be purchased and can still qualify for the fulfillment date X).

In one or more embodiments, to determine the uplift, the machine learning model 130 may use Equations (1)-(4) above, with a four-headed Dragonnet model, wherein a first head of the four heads is associated with the first group of users, a second head of the four heads is associated with the second group of users, a third head of the four heads is associated with generating a propensity score representing a probability of the discrepancy or other context of a user page view being in the first group of users, and a fourth head of the four heads is associated with determining the uplift.

In one or more embodiments, as shown in FIGS. 3A-3D, the a context of a user page view may occur on a same page (e.g., as shown in FIG. 1) or across multiple pages. The actions may occur in real-time during the user's current session, and/or may occur later, and may include real-time updating of the user interface data as shown in FIG. 1, and/or may include sending messages to the user 102 to acknowledge and/or explain the discrepancy or other context of a user page view, provide a correction, offer an apology, and/or offer an incentive or discount as recourse for the discrepancy.

In one or more embodiments, the device 104 and/or the remote system 120 may include a personal computer (PC), a smart home device, a wearable wireless device (e.g., bracelet, watch, glasses, ring, strap/band, patch, bandage, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a context-aware device, a video device, an audio device, a media player, a smartphone, or the like.

FIG. 2 illustrates an example machine learning model used for reinforcement learning-based uplift modeling to mitigate a context of a user page view, in accordance with one or more example embodiments of the present disclosure.

Referring to FIG. 2, a neural network 202 (e.g., a Dragonnet neural network) may have three heads 204 (e.g., head 206 for predicting the treatment outcome (Q(1,)), head 208 for predicting the propensity score g, and head 210 for predicting the control outcome (Q(0,))). An input layer X may be followed by one or more hidden layers 211, and a representation layer Z may be produced based on the input layer X and the one or more hidden layers 211 as described further below. Using the conditional outcomes and the propensity score are predicted by the neural network 202, the machine learning model 130 of FIG. 1, may predict the uplift as explained further below.

Still referring to FIG. 2, the neural network 202 may be extended (e.g., an extended Dragonnet neural network) to form the machine learning model 130. In particular, the machine learning model 130 may add a fourth head to the neural network 202. The fourth head may be a head 212 to predict the uplift. In particular, the machine learning model 130 may use Equations (1)-(4) as described above to predict the uplift based on the predicted outcome ($\hat{Q}(t_i, x_i; \theta)$ and propensity score ($\hat{g}(x_i; \theta)$). The neural network 202 may predict the outcome and propensity score, and the machine learning model 130 represents an enhancement of the neural network 202 by adding the head 212 to predict the uplift.

In one or more embodiments, the inputs to the machine learning model 130 may include the pages of the online retail system 108 visited by users. The remote system 120 of FIG. 1 may generate one data point for any user visit of a page for a product. For any record, the remote system 120 may maintain checkout page information, history information, and page information of pages visited prior to the checkout page. For a checkout page, fulfillment information may come from a fulfillment information mapping table, and product information may come from a product information mapping table. The remote system 120 may perform deduplication of the tables, resulting in a unique record for any combination of user identifier, session identifier, purchase identifier, request identifier, and fulfillment group identifier. For a detail page, fulfillment information may be stored in a table of fulfillment options including fulfillment information before checkout, including product identifiers shown in a search page and/or product detail page. The fulfillment option table may be combined with a daily user sessions table, and the remote system 120 may perform deduplication to generate a unique record for any combination of request identifier, product identifier, offer number, and fulfillment option. The table prepared for the product detail pages (e.g., pre-checkout data) and the table prepared for the checkout page data may be combined to generate one data point for a user's visit to a checkout page. A data point may include a current checkout page segment, a history information segment, a future action segment, and an inconsistency label segment. This data may be input to the machine learning model 130 for modeling.

In one or more embodiments, the inconsistency labels used may include a price-related inconsistency and a promise-related inconsistency. Promise-related inconsistencies may occur within a same day within a same checkout page, between previous and current checkout pages visited during a same day, and between previous product detail and current checkout pages visited for a product on a same day. Based on the inconsistency types, the user behaviors used as the outcomes for the machine learning model 130 may include a purchase-related outcome (e.g., did the user purchase the product in the same day as the discrepancy or other context of a user page view) and a user experience outcome (e.g., did the user visit additional pages for the product after the discrepancy or other context of a user page view, indicating confusion and an attempt to learn more information as a result). The overall impact of discrepancies or other context of a user page view indicated by the uplift of the machine learning model 130 suggest that price-related inconsistencies have significant impact on both purchase and user experiences, and that the purchase impact is lower for a promise-related inconsistency than for a price-related inconsistency. Based on the impact, the remote system 120 may identify discrepancy events or other context of a user page view that are of higher or lower impact.

In one or more embodiments, to train the machine learning model 130, the remote system 120 may drop some features and records, may split some data, and may down-sample. To ensure that any record has a chance to be in the treatment group and control group, the remote system 120 may drop features that may determine whether a record is in a treatment or control group. For example, for an inconsistency when a contract start date is later than an upsell end date, the remote system 120 may retain the contract delivery promise features and remove the upsell delivery promise features. The remote system 120 may drop the records that can be determined to be in the control group. For example, for an inconsistency when a contract start date is later than the upsell end date, the remote system 120 may drop the records with the contract start date being the same day as the date when the customer visited the page. In this case, the contract start date may not be later than upsell end date, and this record may be in control group, and therefore may be discarded. For data splitting, the remote system 120 may split the dataset (e.g., having multiple records indicating a user's checkout page visits for a same product) into multiple independent records based on a user identifier so that records generated by one user are in the same dataset. For down-sampling, the remote system 120 may down-sample data in the control group so that the amount of data in the treatment group is 1:1 with the amount of data in the control group (which should have more overall data than the treatment group). The features that cannot determine the assignment of data to a treatment group or control group may be included in the model. For example, history information features may be retained entirely, partially (e.g., the number of previous pages visited prior to checkout), or not at all.

Figure 3A:
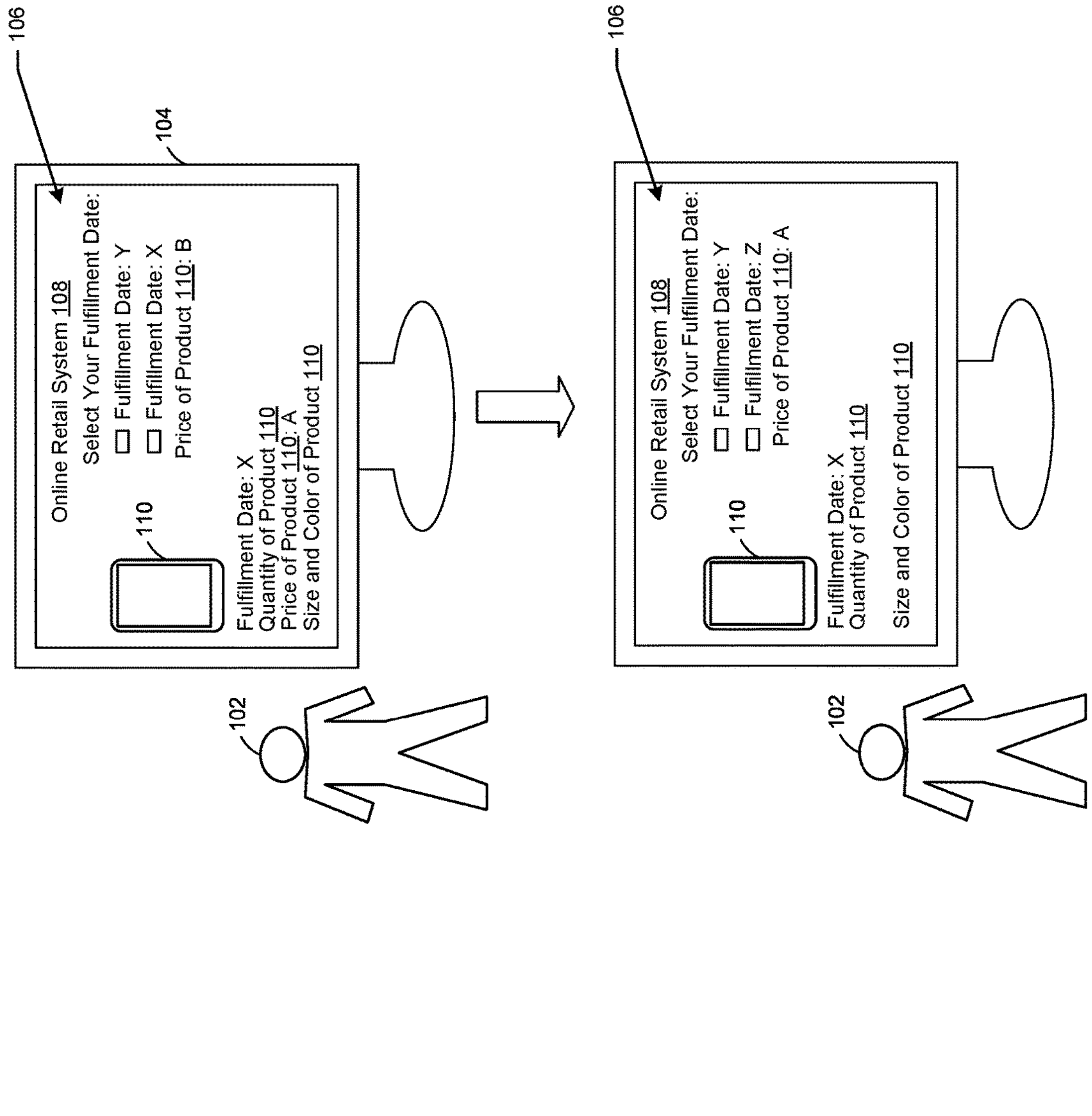
FIG. 3A illustrates detection and mitigation of a context of a user page view using reinforcement learning-based uplift modeling, in accordance with one or more example embodiments of the present disclosure.

FIG. 3A illustrates detection and mitigation of a context of a user page view using reinforcement learning-based uplift modeling, in accordance with one or more example embodiments of the present disclosure.

Referring to FIG. 3A, the page 106 of the online retail system 108 is shown as presented to the user 102 using the device 104 of FIG. 1. The discrepancy (e.g., context of a user page view) occurs on the page 106 (e.g., a same page inconsistency), and is price-related discrepancy (e.g., conflicting prices A and B shown for the product 110, in which the prices A and B may be conflicting per-unit prices, conflicting combined unit prices, or one price may represent the per-unit price while the other price represents a combined unit price). Using the remote system 120 of FIG. 1, the mitigating action performed may include presentation of a real-time update to the pricing information using the page 106, such as correcting the product price to price A. In this manner, the action may occur during the same user session to provide the correct information when the discrepancy occurs.

Figure 3B:
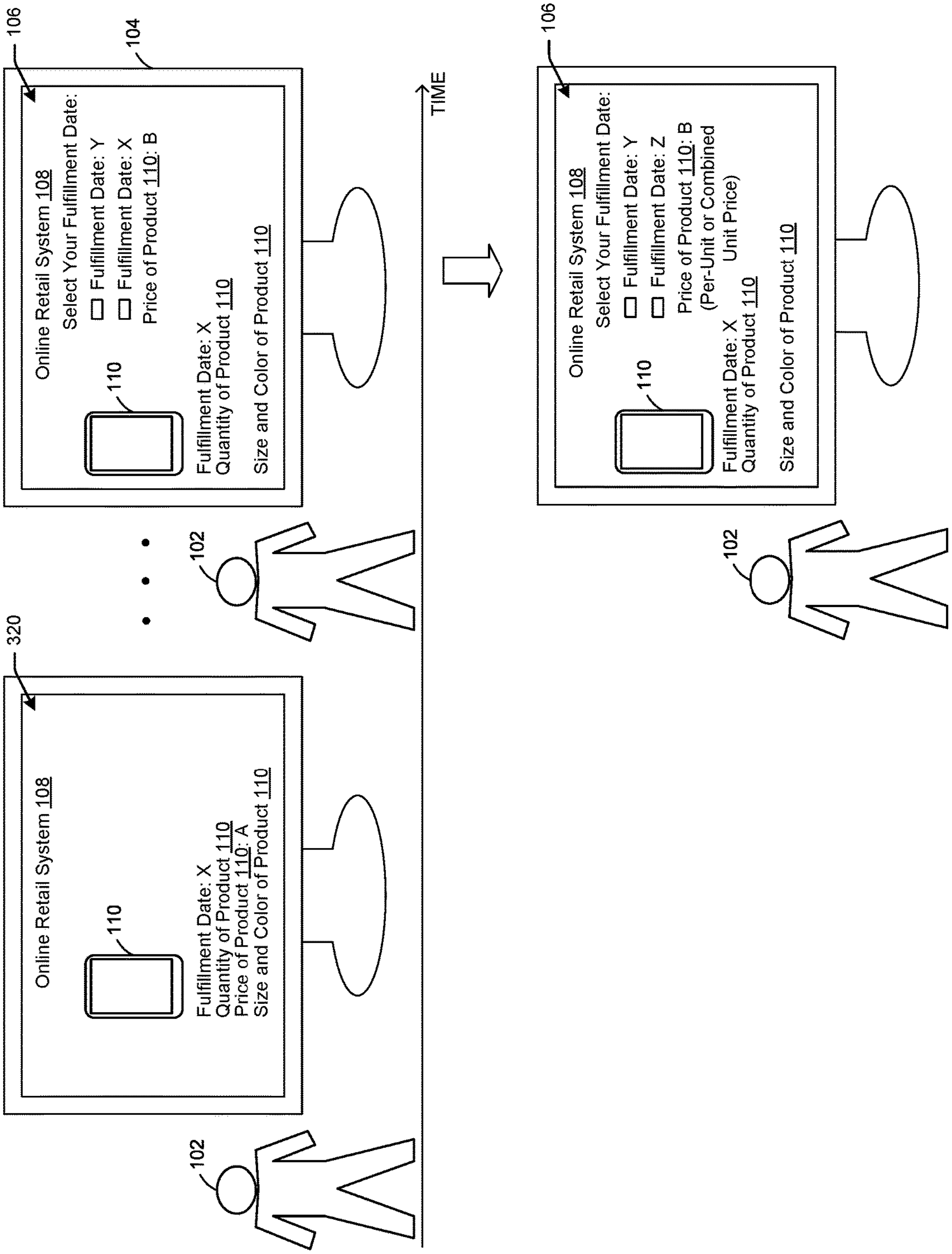
FIG. 3B illustrates detection and mitigation of a context of a user page view using reinforcement learning-based uplift modeling, in accordance with one or more example embodiments of the present disclosure.

FIG. 3B illustrates detection and mitigation of a context of a user page view using reinforcement learning-based uplift modeling, in accordance with one or more example embodiments of the present disclosure.

Referring to FIG. 3B, a page 320 of the online retail system 108 is shown as presented to the user 102 using the device 104 of FIG. 1. Discrepancies or other context of a user page view may occur over multiple pages as shown in FIG. 3B. For example, the user 102 may visit the page 320 prior to visiting the page 106 of FIG. 1 (e.g., during a same session). The page 320 and the page 106 may be pages for the product 110 of FIG. 1, but the price of the product 110 displayed on the page 320 (e.g., a product detail page) may be price A, whereas the price of the product 110 displayed on the page 106 (e.g., a product checkout page) may be price B. The system 120 of FIG. 1 may identify the price discrepancy (e.g., context of a user page view) by detecting the conflicting prices listed for the product 110 during the same user session. The mitigating action may be a real-time notification, presented using the page 106, to indicate the correct price for the product 110. Because price B was already presented, the real-time notification may include additional information, such as whether price B is a per-unit or combined unit price (e.g., explaining the reason for the two different prices, in which one price is a per-unit price, and the other price is a combined unit price).

Figure 3C:
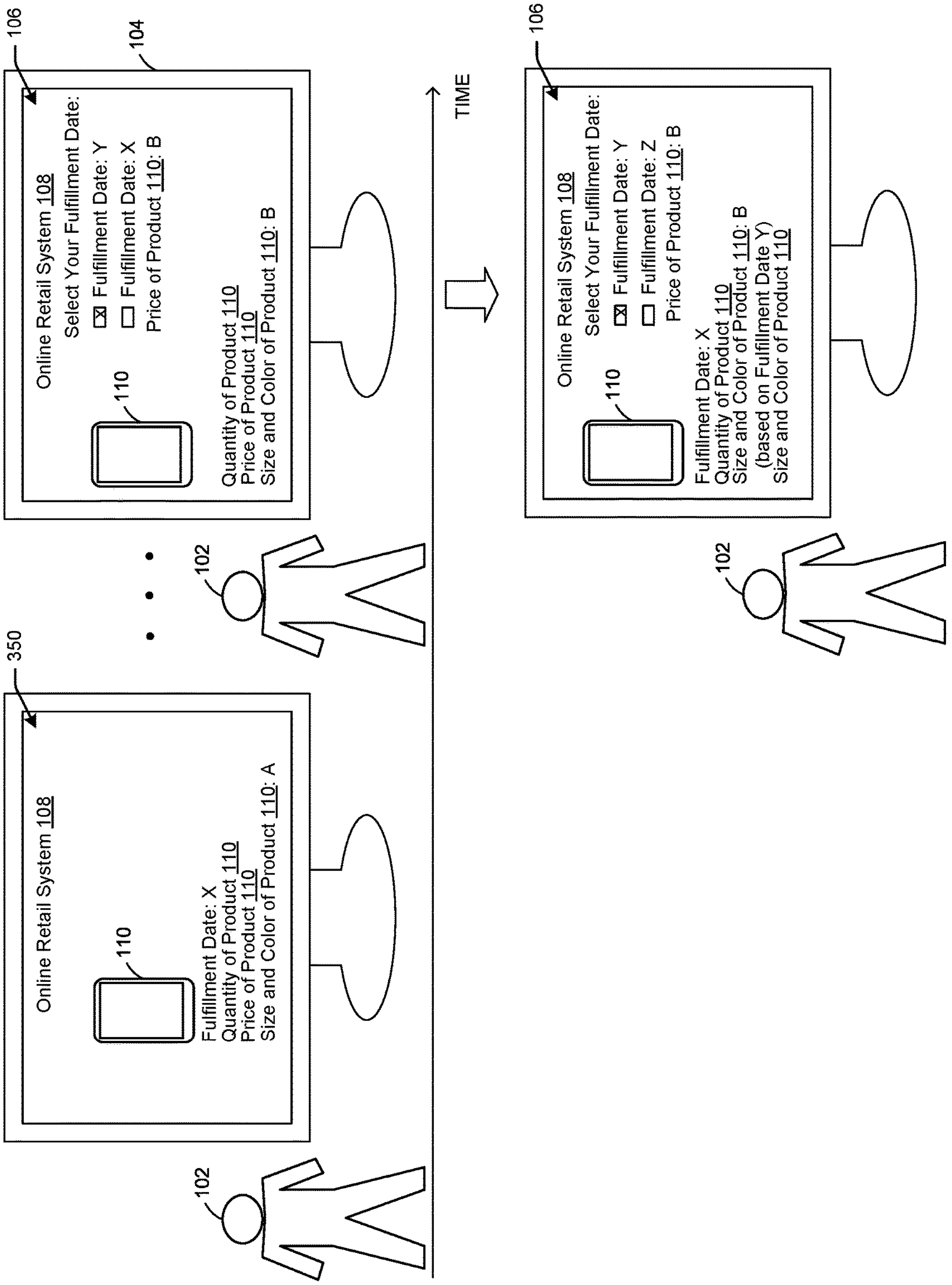
FIG. 3C illustrates detection and mitigation of a context of a user page view using reinforcement learning-based uplift modeling, in accordance with one or more example embodiments of the present disclosure.

FIG. 3C illustrates detection and mitigation of a context of a user page view using reinforcement learning-based uplift modeling, in accordance with one or more example embodiments of the present disclosure.

Referring to FIG. 3C, a page 350 of the online retail system 108 is shown as presented to the user 102 using the device 104 of FIG. 1. Discrepancies or other context of a user page view may occur over multiple pages as shown in FIG. 3C. For example, the user 102 may visit the page 350 prior to visiting the page 106 of FIG. 1 (e.g., during a same session). The page 350 and the page 106 may be pages for the product 110 of FIG. 1, but product information (e.g., product size/color A) of the product 110 displayed on the page 350 (e.g., a product detail page) may be different than the product information (e.g., product size/color B) of the product 110 displayed on the page 106 (e.g., a product checkout page). The system 120 of FIG. 1 may identify the discrepancy (e.g., context of a user page view) by detecting the conflicting information listed for the product 110 during the same user session. The mitigating action may be a real-time notification, presented using the page 106, to indicate the correct information for the product 110. In the example shown, the real-time notification may explain why the available size/color (e.g., product variation) of the product 110 is B when the previously presented size/color of the product 110 was A. Specifically, the user 102 may have selected a different fulfillment option (e.g., changing from date X to date Y), which may have resulted in a different version of the product (e.g., size/color B) being available for that fulfillment date.

In one or more embodiments, while FIGS. 3A and 3B show price-related discrepancies and product information-related discrepancies, other discrepancies or other context of a user page view may occur and be analyzed for their uplift. A promise-related discrepancy may occur when fulfillment options presented on a same page or across different pages viewed for a product during a same user session either conflict or are shown as available on one page (e.g., a product page), but not on another page (e.g., a checkout page). An example of a promise-related fulfillment option discrepancy is shown in FIG. 1, where the discrepancy occurs on a single page. However, the same discrepancy may occur across multiple pages when the fulfillment date X is shown on a product page (e.g., on page 350 of FIG. 3C), but not shown as available on a checkout page (e.g., on page 106). Such a discrepancy may be a system error, but also may be due to a change in user-selected information. For example, when the user 102 changes (e.g., via one of the pages) the quantity or some characteristic (e.g., size, color, etc.) of a product, the change may affect the availability of a fulfillment option. When the remote system 120 identifies such a discrepancy, the remote system 120 may perform a mitigating action of explaining (e.g., using a message such as the real-time notification 352 of FIG. 3B or a separate notification) why the fulfillment option discrepancy occurred. When the fulfillment option discrepancy occurs due to a user-selected change that results in a fulfillment option previously presented no longer being available for a product, the mitigating action may be to indicate (e.g., as shown in FIG. 1), a maximum quantity and/or size of a product that may be purchased using a particular fulfillment option.

Figure 3D:
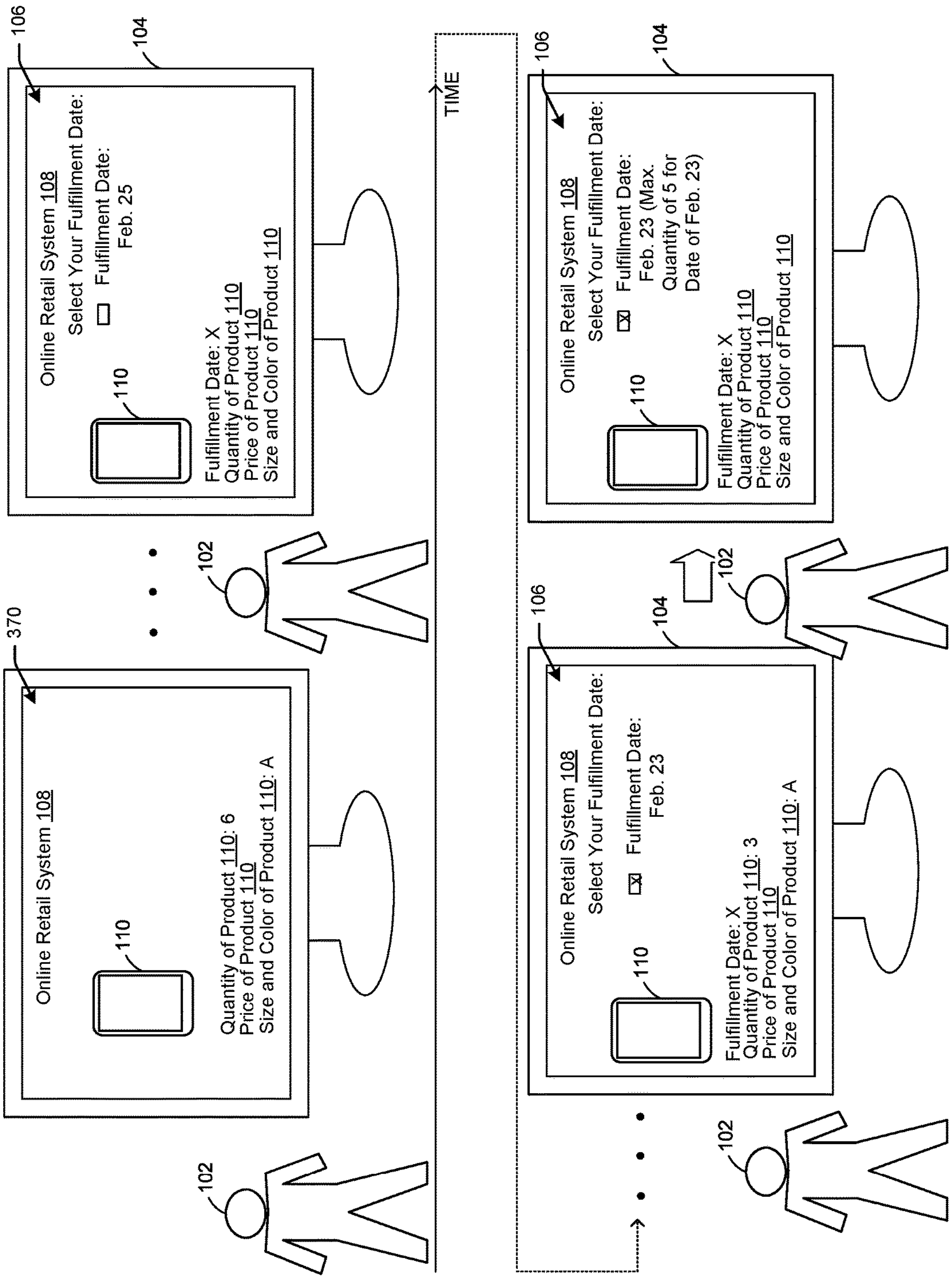
FIG. 3D illustrates detection and mitigation of a context of a user page view using reinforcement learning-based uplift modeling, in accordance with one or more example embodiments of the present disclosure.

FIG. 3D illustrates detection and mitigation of a context of a user page view using reinforcement learning-based uplift modeling, in accordance with one or more example embodiments of the present disclosure.

Referring to FIG. 3D, a page 370 of the online retail system 108 is shown as presented to the user 102 using the device 104 of FIG. 1. The context of a user page view may occur over multiple pages as shown in FIG. 3D. For example, the user 102 may visit the page 370 prior to visiting the page 106 of FIG. 1 (e.g., during a same session). The page 370 and the page 106 may be pages for the product 110 of FIG. 1. From the page 370, the user 102 may add a quantity (e.g., six) of the product 110 to the virtual shopping cart. When the user 102 visits the virtual shopping cart as the page 106, the user 102 may not be satisfied with the fulfillment date for the selected quantity. Instead of selecting purchasing the selected quantity using an available fulfillment option, the user 102 may update the quantity of the product (e.g., from six to three). The page 106 may be updated in real-time to show the available fulfillment options for purchasing three of the product 110. The updated fulfillment options may include an earlier fulfillment date than the dates available for a purchase of six of the product 110. As a result, the mitigating action may be to update the presentation data of the page 106 in real-time to explain that the earlier fulfillment date is available for a certain quantity (e.g., a quantity less than the original six selected by the user 102). In this manner, the user 102 may update the quantity based on the provided explanation.

Referring to FIGS. 3A-3D, the context whose uplift the machine learning model 130 may evaluate may include inconsistencies and other events as shown. The examples in FIGS. 3A-3D are not meant to be limiting; any of the events may be evaluated for uplift whether based on a single page or across multiple page views.

Figure 4A:
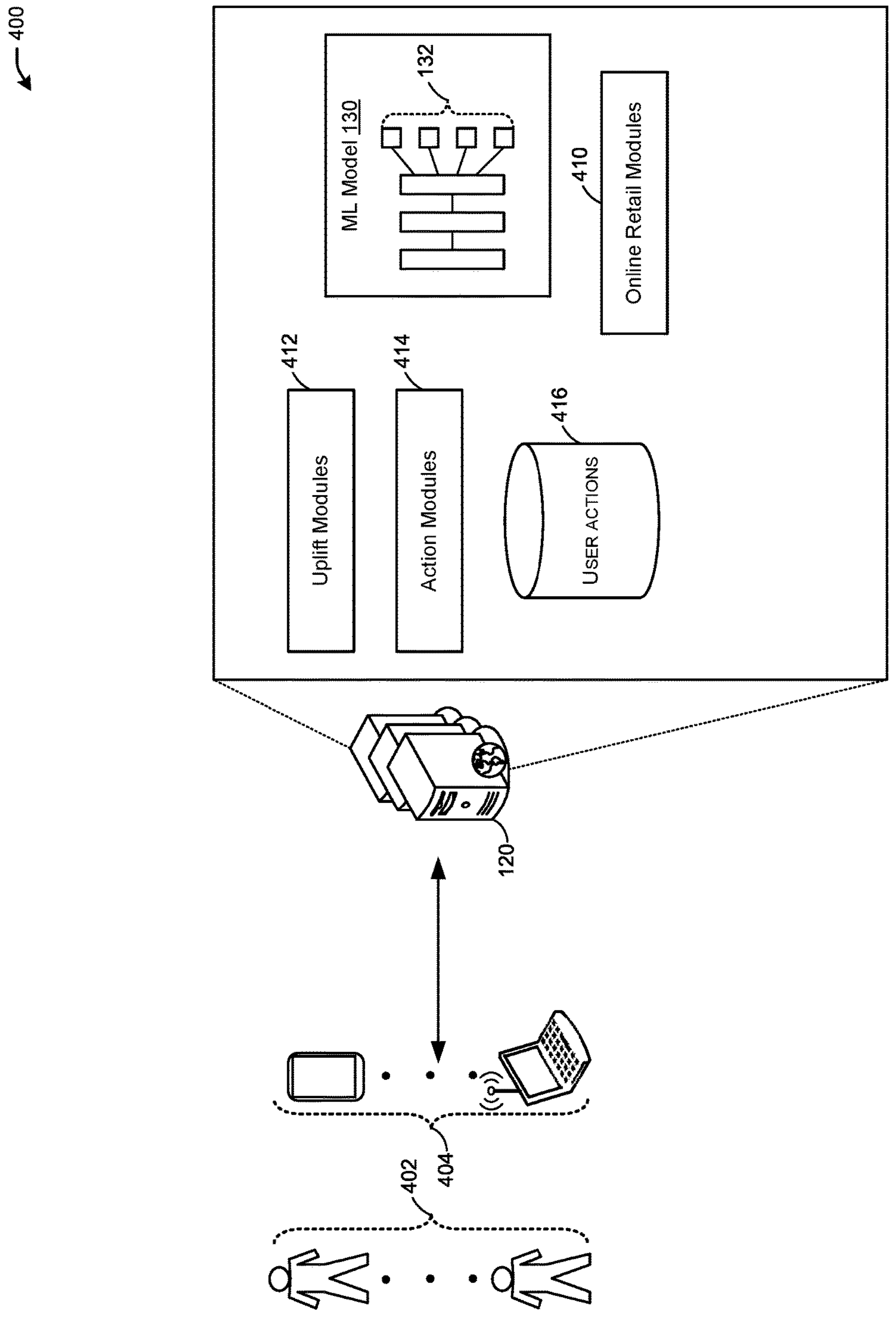
FIG. 4A illustrates an example system for using reinforcement learning-based uplift modeling to mitigate a context of a user page view, in accordance with one or more example embodiments of the present disclosure.

FIG. 4A illustrates an example system 400 for using reinforcement learning-based uplift modeling to mitigate a context of a user page view, in accordance with one or more example embodiments of the present disclosure.

Referring to FIG. 4A, users 402 of devices 404 may access the online retail system 108 provided by the remote system 120 of FIG. 1 to view product pages, search for products, and purchase products. The remote system 120 is shown in more detail, including the machine learning model 130, online retail modules 410 (e.g., to generate and present product and fulfillment data using the pages of the online retail system 108), uplift modules 412 (e.g., to analyze uplift predicted by the machine learning model 130), action modules 414 (e.g., to determine and facilitate actions responsive to detected discrepancies or other context of a user page view), and data storage 416 for user actions (e.g., page views, purchases, customer reviews, etc.).

In one or more embodiments, the uplift modules 412 may perform data preprocessing and generate the data point segments as described above. The uplift modules 412 may fit the machine learning model 130 for product-related and promise-related inconsistencies. The uplift modules 412 may analyze the impact of a discrepancy or other context of a user page view based on the outputs generated by the machine learning model 130. For example, the uplift modules 412 may generate the plots shown in FIGS. 5A-5C to assess user impact of various discrepancies or other context of a user page view, and may rank and prioritize the discrepancies or other context of a user page view based on their impact (e.g., uplift). The uplift modules 412 may train the machine learning model 130 as described above.

Figure 4B:
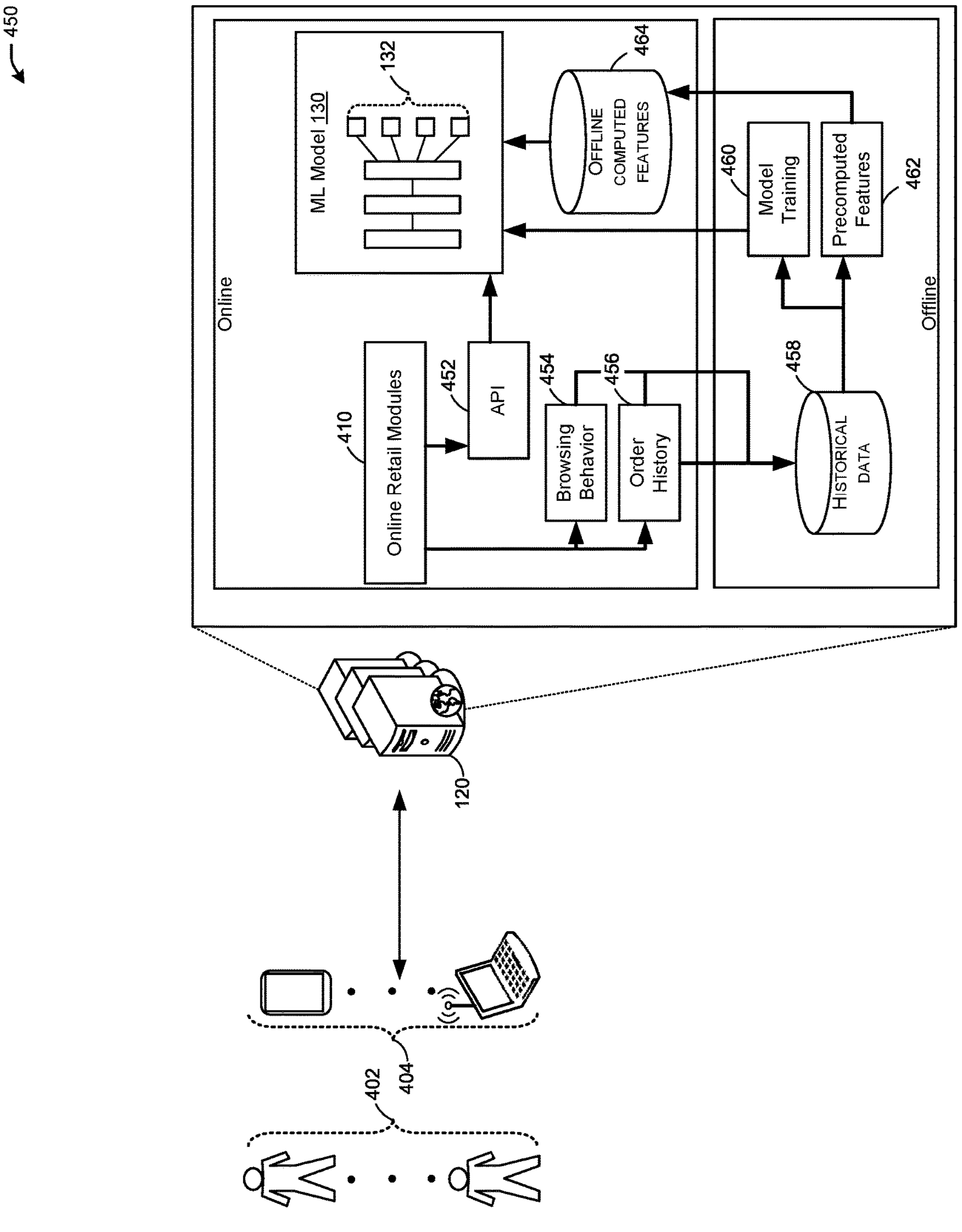
FIG. 4B illustrates an example system for using reinforcement learning-based uplift modeling to mitigate a context of a user page view, in accordance with one or more example embodiments of the present disclosure.

FIG. 4B illustrates an example system 450 for using reinforcement learning-based uplift modeling to mitigate a context of a user page view, in accordance with one or more example embodiments of the present disclosure.

Referring to FIG. 4B, the users 402 of the devices 404 of FIG. 4A may access the online retail system 108 provided by the remote system 120 of FIG. 1 to view product pages, search for products, and purchase products. The remote system 120 is shown in more detail, including the machine learning model 130, and the online retail modules 410 of FIG. 4A. Online, when the users 402 access the online retail system 108, the online retail modules 410 use an application programming interface (API) 452 to call the machine learning model 130 for uplift estimates. User use of the online retail modules 410 results in browsing behavior 454 and order history 456 (e.g., product purchases), which may be stored offline in historical data storage 458. The historical data may be input to a model training 460 for the machine learning model 130, and to precomputed features 462 of the browsing behavior 454 and the order history 456. The precomputed features 462 may be stored online in a data storage 464 of the offline computed features, and may be input to the machine learning model along with the model training 460.

As a result, the machine learning model 130 may be trained offline to estimate the uplift of any context of a page view of the online retail system 108 (e.g., by evaluating treatment groups of users who experienced a context of a page view and control groups who did not, as explained above). In this manner, when the remote system 120 detects any context of a page view (e.g., based on the browsing behavior 454 and order history 456), the remote system 120 may call the machine learning model 130 for the uplift of the context of the page view, and the machine learning model 130 may provide the uplift for further analysis and use (e.g., evaluation of uplift significance and performance of mitigating actions).

Figure 5A:
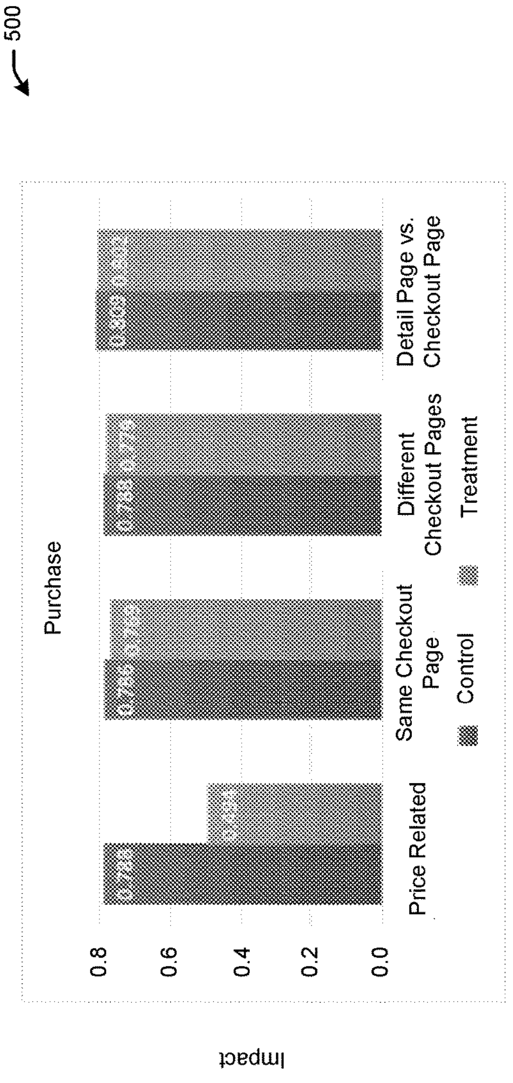
FIG. 5A shows graphical representations of uplift estimated using reinforcement learning-based uplift modeling, in accordance with one or more example embodiments of the present disclosure.

FIG. 5A shows graphical representations of uplift estimated using reinforcement learning-based uplift modeling, in accordance with one or more example embodiments of the present disclosure.

Referring to FIG. 5A, the plot 500 shows the purchase impact of a price-related discrepancy or other context of a user page view on a treatment group versus a control group, the purchase impact of a price-related discrepancy or other context of a user page view occurring on a same checkout page on a treatment group versus a control group, the purchase impact of a price-related discrepancy or other context of a user page view occurring on different checkout pages on a treatment group versus a control group, and the purchase impact of a price-related discrepancy or other context of a user page view occurring on a detail page versus a checkout page on a treatment group versus a control group.

Figure 5B:
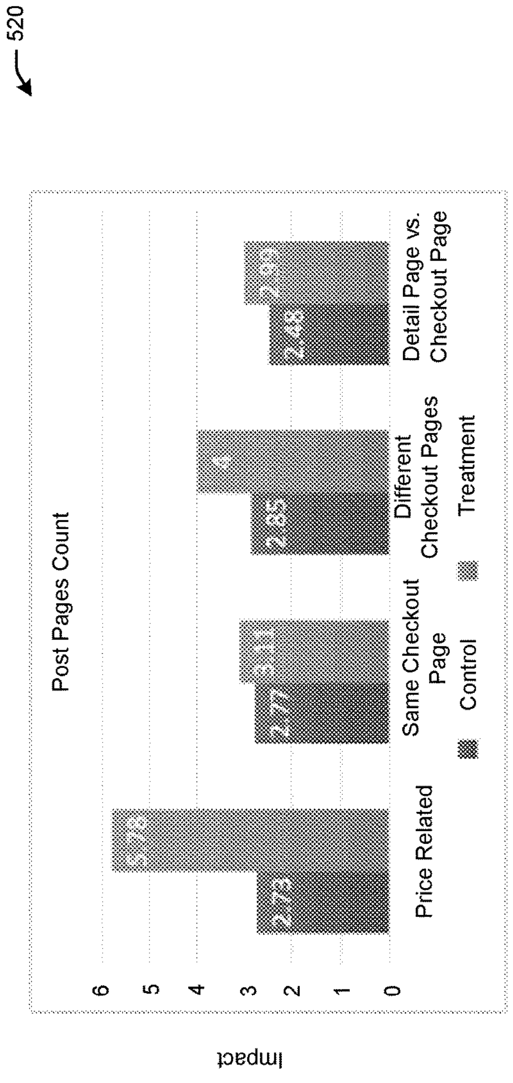
FIG. 5B shows graphical representations of uplift estimated using reinforcement learning-based uplift modeling, in accordance with one or more example embodiments of the present disclosure.

FIG. 5B shows graphical representations of uplift estimated using reinforcement learning-based uplift modeling, in accordance with one or more example embodiments of the present disclosure.

Referring to FIG. 5B, the plot 520 shows the number of pages viewed for a product after viewing the purchase page for the product (e.g., post pages count) impact of a price-related discrepancy or other context of a user page view on a treatment group versus a control group, the post pages count impact of a discrepancy or other context of a user page view occurring on a same checkout page on a treatment group versus a control group, the post pages count impact of a discrepancy or other context of a user page view occurring on different checkout pages on a treatment group versus a control group, and the post pages count impact of a discrepancy or other context of a user page view occurring on a detail page versus a checkout page on a treatment group versus a control group.

Referring to FIGS. 5A and 5B, the actions performed by the treatment and control groups may include purchasing or not purchasing a product (e.g., FIG. 5A) and the number of subsequent pages viewed by users after a subsequent page (e.g., FIG. 5B). For a purchase-related outcome as in FIG. 5A, the treatment group may include users who purchased the product and users who did not purchase the product after being presented the discrepancy or other context of a user page view. The mean value for such a treatment group may indicate the mean number of users in the treatment group who purchased the product after the discrepancy or other context of a user page view. The control group of a purchase-related outcome in FIG. 5A may represent users who were not presented the discrepancy or other context of a user page view, so the mean value for the control group may represent the mean number of users in the treatment group who purchased the product after being presented the same product price, either on a same checkout page, different checkout page, or between a product detail page and the checkout page. For a page count outcome as in FIG. 5B, the treatment group may include users who visited additional pages after being presented a discrepancy or other context of a user page view on the product page. The control group for the page count outcome may include users who visited additional pages after being presented consistent information on a same checkout page or across multiple pages. In this manner, the mean page value for the treatment group may represent the number of additional pages viewed after the discrepancy or other context of a user page view, and prior to purchase, and the mean page value for the control group may represent the number of additional pages viewed after consistent product information is presented.

Figure 5C:
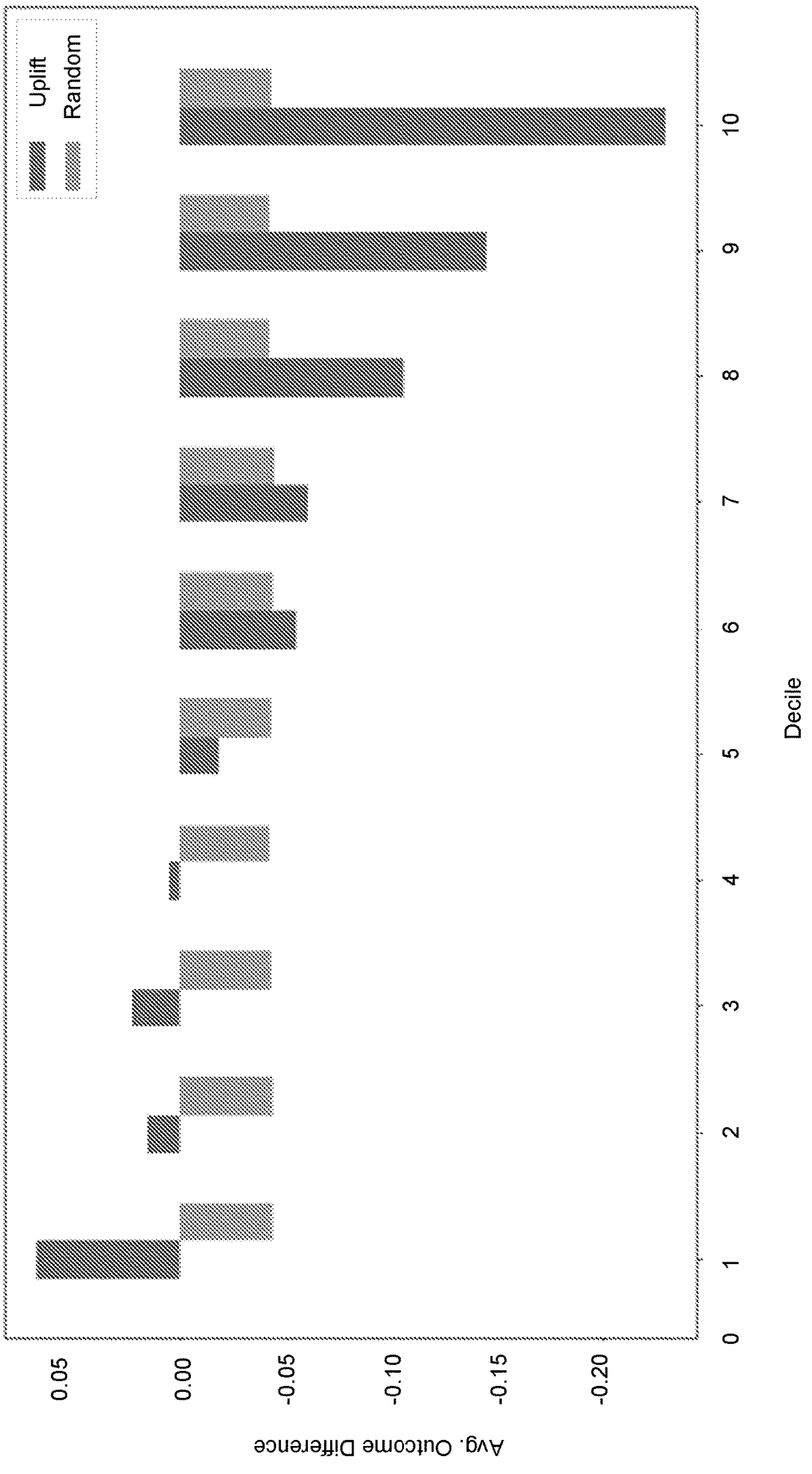
FIG. 5C shows graphical representations of outcome differences estimated using reinforcement learning-based uplift modeling, in accordance with one or more example embodiments of the present disclosure.

FIG. 5C shows graphical representations of outcome differences estimated using reinforcement learning-based uplift modeling, in accordance with one or more example embodiments of the present disclosure.

Referring to FIG. 5C, the plot 540 shows the average outcome difference between uplift estimated by the machine learning model 130 of FIG. 1 ("uplift") and real uplift calculated for random ordered discrepancy or other context of a user page view events ("random"). To produce the plot 540, the uplift modules 412 of FIG. 4A may order the uplift data from high to low, and divide the data into different bins (e.g., deciles). Each bin may include data for treatment group users and control group users. The machine learning model 130 may determine the difference in the mean values of the outcome for the treatment group and control group, and the difference may represented as the real uplift for the bin. To identify the most sensitive (e.g., impacted) discrepancy or other context of a user page view events, the uplift modules 412 may evaluate the three right-most deciles because those deciles should have the most significant negative uplift. The plot 540 shows that on average, promise related inconsistency decreases the purchase rate by 0.043 (random uplift). In 10th decile, the machine learning model 130 identifies a segment for which a discrepancy or other context of a user page view decreases the purchase rate by −0.229. This is more than five times the random uplift. In addition, for the 9th and 8th deciles, the machine learning model 130 also identifies segments for which a discrepancy or other context of a user page view decreases the purchase rate more than the random uplift, indicating that the machine learning model 130 is able to identify the segment of data that is more sensitive to the inconsistency.

Figure 6A:
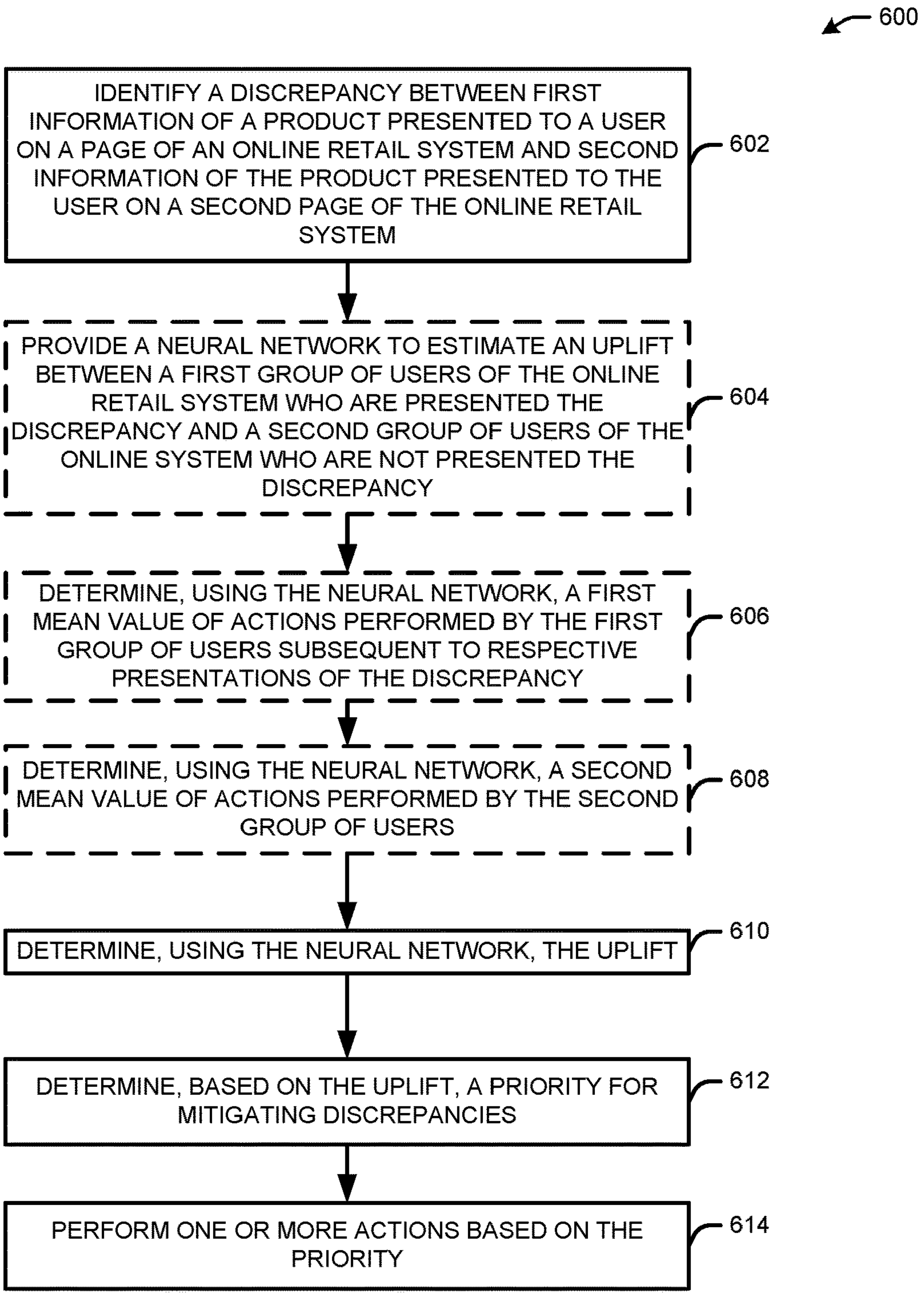
FIG. 6A illustrates a flow diagram for a process for using reinforcement learning-based uplift modeling to mitigate a context of a user page view, in accordance with one or more example embodiments of the present disclosure.

FIG. 6A illustrates a flow diagram for a process 600 for using reinforcement learning-based uplift modeling to mitigate a context of a user page view, in accordance with one or more example embodiments of the present disclosure.

At block 602, a device (or system, e.g., the remote system 120 of FIG. 1) may identify a discrepancy (e.g., inconsistency) between first information of a product presented to a user on a page of an online retail system (e.g., the online retail system 108 of FIG. 1) and second information of the product presented on the page or on another page, during a same user session (e.g., during a same day as the presentation of the first information), of the online retail system. For example, the discrepancy may be price-related in that different prices for the same product may be presented on a same page or on different pages (e.g., a price on a product information page may be different than a price on the checkout page). The discrepancy may be fulfillment-related in that a fulfillment option may be presented as available for the product on one page and may be presented as unavailable for the product on the same page or another page. The discrepancy may be information-related, such as colors, sizes, and other product details that may be presented as available on one page and unavailable on the same page or another page. The device may have access to the product information presented on pages of the online retail system, and may identify which pages were presented to any user of the online retail system during a respective user session. By comparing the product information presented to a user, the device may identify the discrepancy.

At block 604, optionally, the device may provide a neural network (e.g., the machine learning model 130 of FIG. 1) trained to estimate an uplift between a first group of users (e.g., including the user) of the online retail system who have been presented the discrepancy, and a second group of users of the online retail system who have not been presented the discrepancy. In this manner, the first group of users may represent the treatment group of an uplift model, and the second group of users may represent the control group of the uplift model. The neural network may be a multi-headed model using Equations (1)-(4) above to estimate the uplift. The device may determine the uplift for any type of discrepancy.

In some embodiments, the neural network is trained to estimate an uplift between a first group of users (e.g., including the user) of the online retail system who have been presented a discrepancy similar to the discrepancy mentioned above, and a second group of users of the online retail system who have not been presented the similar discrepancy. Similar discrepancy may be of the same type, for example, they both are a discrepancy related to a price or they are both a discrepancy related to a fulfillment date. In some embodiments, similar discrepancies have a combination of similar discrepancies, for example, the description and price are inconsistent. In some embodiments, similar discrepancies relate to the degree of the discrepancy, for example, two discrepancies may be similar if the price has changed over 10%. In some embodiments, similar discrepancies are discrepancies on product pages for products in the same category of goods. In some embodiments, similar discrepancies are the same discrepancy.

At block 606, optionally, the device may determine, using the neural network, a first mean value of the actions for the first group of users. At block 608, optionally, the device may determine, using the neural network, a second mean value for the second group of users. For a purchase-related outcome as in FIG. 5A, the treatment group may include users who purchased the product and users who did not purchase the product after being presented the discrepancy. The mean value for such a treatment group may indicate the mean number of users in the treatment group who purchased the product after the discrepancy. The control group of a purchase-related outcome in FIG. 5A may represent users who were not presented the discrepancy, so the mean value for the control group may represent the mean number of users in the treatment group who purchased the product after being presented the same product price, either on a same checkout page, different checkout page, or between a product detail page and the checkout page. For a page count outcome as in FIG. 5B, the treatment group may include users who visited additional pages after being presented a discrepancy on the product page. The control group for the page count outcome may include users who visited additional pages after being presented consistent information on a same checkout page or across multiple pages. In this manner, the mean page value for the treatment group may represent the number of additional pages viewed after the discrepancy, and prior to purchase, and the mean page value for the control group may represent the number of additional pages viewed after consistent product information is presented.

At block 610, the device may determine the uplift based on a difference between the first and second mean values. The model may be trained to estimate the uplift based on the discrepancy, so the steps of blocks 604-608 may be performed at some point to train the model, but may not be required in real-time to assess the impact of the current discrepancy. The device may use the neural network to implement Equations (1)-(4) above to estimate the uplift, controlling for confounding factors that may correlate to the actions performed by the users. In particular, the device may generate the treatment and control groups by identifying the actions of users who were presented the discrepancy, and identifying other users who performed those actions without being presented the discrepancy. In this manner, the device may estimate the impact of the discrepancy. For any discrepancy, a single outcome may be observed (e.g., either a treatment group of control group). The outcomes may be purchase outcomes (e.g., whether a user purchased the product after the discrepancy) or user experience outcomes (e.g., the number of pages a user visited after the discrepancy and prior to eventual purchase of the product). In this manner, the neural network may predict the likelihood of a user purchasing the product within a same day after the discrepancy, and the likelihood of the user visiting subsequent pages after the discrepancy and prior to purchase on the same day. By taking the mean value of the treatment group (e.g., indicating likelihood of purchase or no purchase, number of subsequent page views, etc.) and the mean value of the outcome among the control group, the neural network may estimate the uplift for the discrepancy. The neural network account for confounding factors, as confounding factors may be related to the treatment group assignments and therefore may be removed (e.g., using Equations (1)-(4)) to more accurately estimate the uplift.

At block 612, the device may determine, based on the uplift, a priority for mitigating the discrepancies. The difference between the two mean values for the treatment and control groups may represent the impact of the discrepancy. In this manner, the overall impact of the discrepancy may be measured over a group of users rather than for just one single discrepancy event. Based on the impact of multiple discrepancies presented using the online retail system, the device may rank the discrepancies in terms of their impact, and may prioritize the performance of mitigating actions based on the rankings. For example, the device may prioritize performance of actions for higher-priority (e.g., higher-impact) discrepancies over lower-priority discrepancies. The device may perform real-time mitigating actions in response to higher-priority discrepancies, such as by altering the presentation data (e.g., user interface data such as shown in FIGS. 1 and 3A-3C) on a page currently viewed by the user.

At block 614, the device may facilitate performance of one or more actions based on the priority. The mitigating actions may occur within the online retail system or externally, in real-time or after a user session has completed. For example, the mitigating actions may include messages presented to the user via user interfaces of the online retail system, such as explanations, apologies, and offers, and/or may include external messages such as emails, text messages, and the like, apologizing, explaining that the discrepancy has been corrected, and providing offers. When a discrepancy is between different fulfillment options for a same product, the mitigating action may be to present a real-time message, using the page one which the discrepancy occurs, to indicate a maximum quantity of the product that may be purchased at a particular time while qualifying for one of the fulfillment options.

Figure 6B:
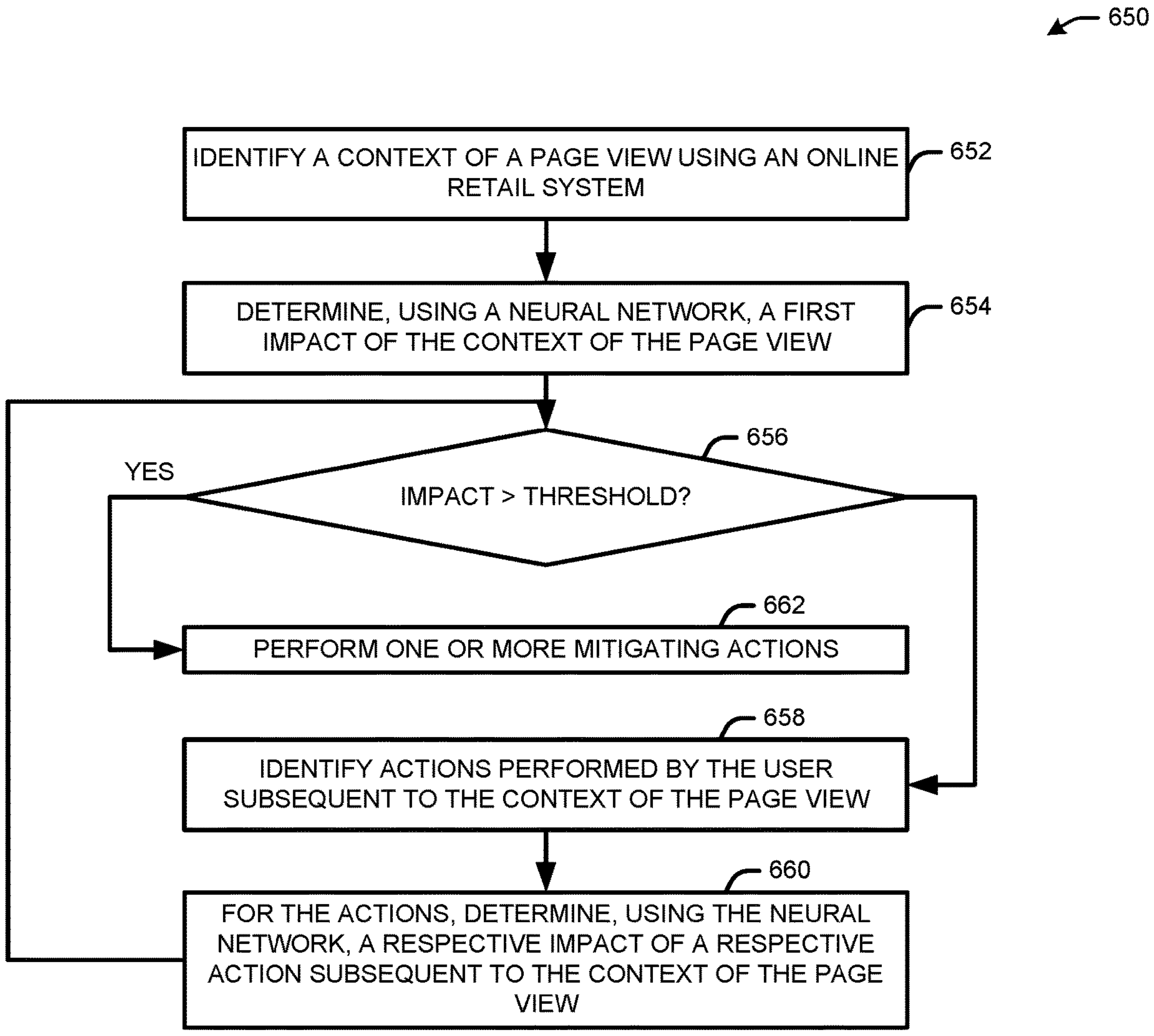
FIG. 6B illustrates a flow diagram for a process for using reinforcement learning-based uplift modeling to mitigate a context of a user page view, in accordance with one or more example embodiments of the present disclosure.

FIG. 6B illustrates a flow diagram for a process 650 for using reinforcement learning-based uplift modeling to mitigate a context of a user page view, in accordance with one or more example embodiments of the present disclosure.

At block 652, a device (or system, e.g., the remote system 120 of FIG. 1) may identify a context of a page view associated with first information of a product presented, using a second device (e.g., the device 104 of FIG. 1), to a user on a first page of an online retail system (e.g, the online retail system 108 of FIG. 1) and second product information of the product presented, using the second device, to the user on a second page of the online retail system. The first and second pages may be the same page or different pages. The context of the page view may be any event that may indicate a user pain point, such as an information discrepancy, a user change in selected product quantity after reaching the checkout/purchase page, a user change in selected fulfillment option reaching the checkout/purchase page, a user change in a product variation after reaching the checkout/purchase page, a user not purchasing the product within a certain amount of time after reaching the checkout/purchase page, and the like.

At block 654, the device may determine, using a neural network (e.g., the machine learning model 130 of FIG. 1), the impact of the context of the page view on the user. In some embodiments, the impact is based on a modeled uplift between a first group of users of the online retail system who are presented the context of the page view and a second group of users of the online retail system who are not presented the context of the page view.

At block 656, the device may compare the impact of any context of a page view to a threshold indicative of the significance/strength of the impact of the context of the page event (e.g., strong, medium, weak, etc.). The threshold may be set at medium or weak, for example, so that context of a page view that has an impact below the threshold may not result in immediate mitigation action, if any. When the impact is below the threshold, the device may evaluate subsequent actions taken by the user (e.g., additional page views, changes in quantity or fulfillment options prior to purchase, etc.) at block 658.

At block 660, the device may estimate the impact, using the neural network, for any additional action. As described above, the neural network may be trained based on treatment and control groups (e.g., based on groups of users who performed the actions after the context of the page view and users who performed the actions without the context of the page view) to estimate the impact of an action performed subsequent to the context of a page view. When any context of a page view has an impact greater than the threshold at block 656, the device may, at block 658 perform any of the mitigating actions described herein.

The descriptions herein are not meant to be limiting.

Figure 7:
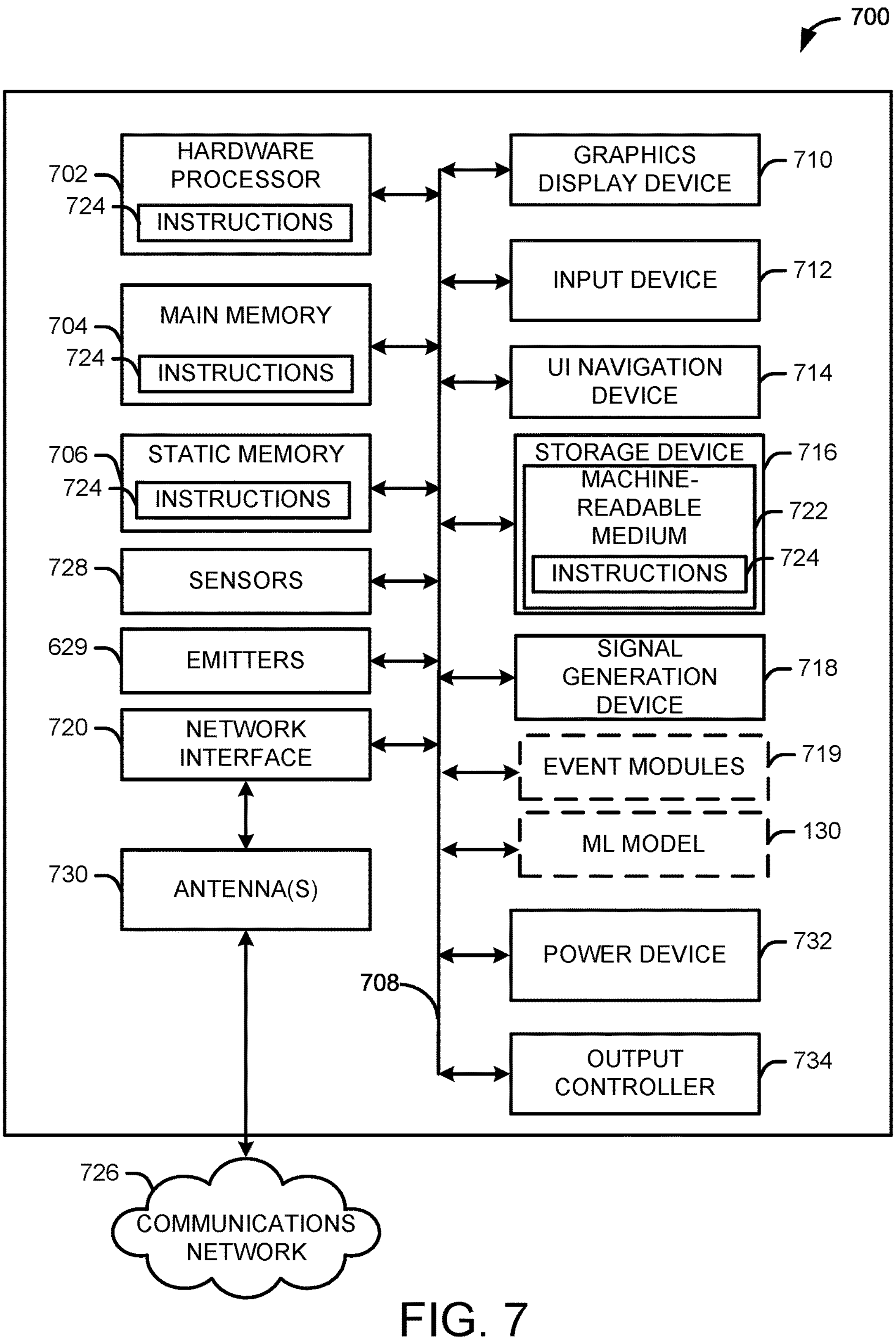
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., the device 104 of FIG. 1, the remote system 120 of FIG. 1) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act in Wi-Fi direct, peer-to-peer (P2P), cellular, (or other distributed) network environments. The machine 700 may be a server, a personal computer (PC), a smart home device, a tablet PC, a personal digital assistant (PDA), a mobile telephone, a wearable computer device, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718, one or more event modules 719 (e.g., similar to the online retail modules 410, the uplift modules 412, and/or the action modules 414 of FIG. 1), a network interface device/transceiver 720 coupled to antenna(s) 730, one or more sensors 728, one or more emitters 729, and the machine learning model 130 of FIG. 1. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for modeling uplift to detect and mitigate user outcomes, the method comprising:

identifying, by at least one processor of a first device, a context of a page view associated with first information of a product presented, using a second device, to a user on a first page of an online retail system and second product information of the product presented, using the second device, to the user on a second page of the online retail system;

providing, by the at least one processor, a neural network configured to estimate an uplift between a first group of users of the online retail system who are presented the context of the page view and a second group of users of the online retail system who are not presented the context of the page view;

determining, by the at least one processor, using the neural network, the uplift; and causing, by the at least one processor, based on the uplift, performance of an action associated with mitigating the context of the page view, wherein performance of the action comprises updating the first page of the online retail system during a user session during which the context of the page view occurs.

2. The method of claim 1, wherein the context of the page view comprises a discrepancy between a first price of the product presented to the user on the first page and a second price of the product presented to the user on the second page.

3. The method of claim 1, wherein the context of the page view comprises a discrepancy between a first fulfillment option of the product presented to the user on the first page and a second fulfillment option of the product presented to the user on the second page.

4. The method of claim 1, wherein the context of the page view comprises a discrepancy between a color, size, or quantity of the product presented to the user on the first page and a second color, size, or quantity of the product presented to the user on the second page.

5. The method of claim 1, wherein the context of the page view comprises a first user selection of a first quantity of the product using the first page, and a second user selection of a second quantity of the product, different than the first quantity of the product, using the second page, wherein the first quantity of the product is associated with a first fulfillment date, and wherein the second quantity of the product is associated with a second fulfillment date earlier than the first fulfillment date.

6. The method of claim 1, further comprising:

identifying actions performed by the user subsequent to presentation of the context of the page view;

determining, using the actions as inputs to the neural network, a second uplift between a third group of users of the online retail system who are presented the context of the page view and performed the actions and a fourth group of users of the online retail system who are not presented the context of the page view;

determining that the uplift is below a threshold uplift; and determining that the second uplift exceeds the threshold uplift, wherein causing performance of the action is further based on the second uplift exceeding the threshold uplift, and comprises refraining from performance of the action prior to the actions based on the uplift being below the threshold uplift.

7. The method of claim 1, wherein the neural network comprises a four-headed Dragonnet model, wherein a first head of the four heads is associated with the first group of users, a second head of the four heads is associated with the second group of users, a third head of the four heads is associated with generating a propensity score representing a probability of an event being associated with the context of the page view, and a fourth head of the four heads is associated with determining the uplift.

8. The method of claim 1, wherein the first page and the second page are a same page.

9. The method of claim 1, wherein the first page is different than the second page.

10. The method of claim 1, wherein the first group of users and the second group of users purchased the product subsequent to the context of the page view, wherein the uplift is indicative of viewing additional pages of the online retail system subsequent to the context of the page view.

11. The method of claim 1, wherein the action comprises purchasing the product or failing to purchase the product, wherein the uplift is indicative of a likelihood of purchasing the product subsequent to the context of the page view.

12. A system for modeling impact to detect and mitigate user outcomes, the system comprising:

a first device configured to present pages using an online retail system;

a second device configured to cause presentation, at the first device, of the pages using the online retail system; and a multi-headed neural network, wherein the second device is further configured to:

identify a context of a page view associated with first information of a product presented, using the first device, to a user on a first page of the online retail system and second product information of the product presented, using the first device, to the user on a second page of the online retail system;

provide the neural network, wherein the neural network is configured to estimate an impact of the context of the page view on a user;

determine, using the neural network, the impact; and cause, based on the impact, performance of an action associated with mitigating the context of the page view, wherein performance of the action comprises updating the first page of the online retail system during a user session during which the context of the page view occurs.

13. The system of claim 12, wherein the neural network is configured to estimate the impact of the context of the page view on the user, based on an uplift between a first group of users of the online retail system who are presented a second context of the page view that is similar to the context of the page view and a second group of users of the online retail system who are not presented the second context of the page view.

14. A device for modeling impact to detect and mitigate user outcomes, the device comprising memory coupled to at least one processor configured to:

cause presentation, at a second device, of pages using an online retail system;

identify a context of a page view associated with first information of a product presented, using the second device, to a user on a first page of the online retail system and second product information of the product presented, using the second device, to the user on a second page of the online retail system;

provide processing circuitry of a neural network, wherein the neural network is configured to estimate an impact of the context of the page view on a user;

determine, using the neural network, the impact; and cause, based on the impact, performance of an action associated with mitigating the context of the page view, wherein performance of the action comprises updating the first page of the online retail system during a user session during which the context of the page view occurs.

15. The device of claim 14, wherein the context of the page view comprises a discrepancy between a first price of the product presented to the user on the first page and a second price of the product presented to the user on the second page.

16. The device of claim 14, wherein the context of the page view comprises a discrepancy between a first fulfillment option of the product presented to the user on the first page and a second fulfillment option of the product presented to the user on the second page.

17. The device of claim 14, wherein the context of the page view comprises a discrepancy between a color, size, or quantity of the product presented to the user on the first page and a second color, size, or quantity of the product presented to the user on the second page.

18. The device of claim 14, wherein the context of the page view comprises a first user selection of a first quantity of the product using the first page, and a second user selection of a second quantity of the product, different than the first quantity of the product, using the second page, wherein the first quantity of the product is associated with a first fulfillment date, and wherein the second quantity of the product is associated with a second fulfillment date earlier than the first fulfillment date.

* * * * *